United States Patent
Krapf et al.

(10) Patent No.: US 12,462,114 B2
(45) Date of Patent: Nov. 4, 2025

(54) APPLIED ARTIFICIAL INTELLIGENCE TECHNOLOGY FOR INTEGRATING NATURAL LANGUAGE NARRATIVE GENERATION WITH NEWSFEEDS

(71) Applicant: Salesforce, Inc., San Francisco, CA (US)

(72) Inventors: Nathan William Krapf, Chicago, IL (US); Michael Justin Smathers, Chicago, IL (US); Nathan Drew Nichols, Chicago, IL (US); Matthew Lloyd Trahan, Grayslake, IL (US)

(73) Assignee: Salesforce, Inc., San Francisco, CA (US)

( * ) Notice: Subject to any disclaimer, the term of this patent is extended or adjusted under 35 U.S.C. 154(b) by 258 days.

(21) Appl. No.: 18/161,311

(22) Filed: Jan. 30, 2023

(65) Prior Publication Data

US 2024/0135114 A1    Apr. 25, 2024

Related U.S. Application Data

(60) Provisional application No. 63/305,032, filed on Jan. 31, 2022.

(51) Int. Cl.
  *G06F 40/30* (2020.01)
  *G06F 40/56* (2020.01)
  (Continued)

(52) U.S. Cl.
  CPC .............. *G06F 40/56* (2020.01); *G06F 40/30* (2020.01); *H04L 67/535* (2022.05); *H04L 67/55* (2022.05)

(58) Field of Classification Search
  CPC ......... G06F 40/295; G06F 40/30; G06F 40/56
  See application file for complete search history.

(56) References Cited

U.S. PATENT DOCUMENTS

| 4,992,939 | A | 2/1991 | Tyler |
| 5,619,631 | A | 4/1997 | Schott |

(Continued)

FOREIGN PATENT DOCUMENTS

| WO | 9630844 A1 | 10/1996 |
| WO | 2006122329 A2 | 11/2006 |

(Continued)

OTHER PUBLICATIONS

Albert Gatt and Emiel Krahmer. 2018. Survey of the state of the art in natural language generation: core tasks, applications and evaluation. J. Artif. Int. Res. 61, 1 (Jan. 2018), 65-170. (Year: 2018).

(Continued)

*Primary Examiner* — Daniel Abebe
(74) *Attorney, Agent, or Firm* — Polygon IP, LLP

(57) ABSTRACT

Systems and methods are disclosed for integrating NLG-based natural language narrative story generation with story sharing. A processor can (1) generate a plurality of natural language narrative stories based on a plurality of semantic source models for the natural language narrative stories, (2) analyze the semantic source models to determine a plurality of users to whom the natural language narrative stories that are generated from the analyzed semantic source models are to be shared, and (3) share the generated natural language narrative stories with their determined users. In this fashion, stories can be posted to user-customized newsfeeds in a manner that can more reliably capture stories that are of interest to the users.

35 Claims, 27 Drawing Sheets

(51) Int. Cl.
*H04L 67/50* (2022.01)
*H04L 67/55* (2022.01)

(56) References Cited

U.S. PATENT DOCUMENTS

| | | |
|---|---|---|
| 5,687,364 A | 11/1997 | Saund |
| 5,734,916 A | 3/1998 | Greenfield |
| 5,794,050 A | 8/1998 | Dahlgren |
| 5,802,495 A | 9/1998 | Goltra |
| 5,999,664 A | 12/1999 | Mahoney |
| 6,006,175 A | 12/1999 | Holzrichter |
| 6,144,938 A | 11/2000 | Surace |
| 6,278,967 B1 | 8/2001 | Akers |
| 6,289,363 B1 | 9/2001 | Consolatti |
| 6,502,081 B1 | 12/2002 | Wiltshire, Jr. |
| 6,622,152 B1 | 9/2003 | Sinn |
| 6,651,218 B1 | 11/2003 | Adler |
| 6,665,666 B1 | 12/2003 | Brown |
| 6,697,998 B1 | 2/2004 | Damerau |
| 6,757,362 B1 | 6/2004 | Cooper |
| 6,771,290 B1 | 8/2004 | Hoyle |
| 6,810,111 B1 | 10/2004 | Hunter |
| 6,820,237 B1 * | 11/2004 | Abu-Hakima ........ G06F 40/169 715/250 |
| 6,917,936 B2 | 7/2005 | Cancedda |
| 6,968,316 B1 | 11/2005 | Hamilton |
| 6,976,031 B1 | 12/2005 | Toupal |
| 6,976,207 B1 | 12/2005 | Rujan |
| 7,027,974 B1 | 4/2006 | Busch |
| 7,085,771 B2 | 8/2006 | Chung |
| 7,089,241 B1 | 8/2006 | Alspector |
| 7,191,119 B2 | 3/2007 | Epstein |
| 7,246,315 B1 | 7/2007 | Andrieu |
| 7,324,936 B2 | 1/2008 | Saldanha |
| 7,333,967 B1 | 2/2008 | Bringsjord |
| 7,496,567 B1 | 2/2009 | Steichen |
| 7,496,621 B2 | 2/2009 | Pan |
| 7,577,634 B2 | 8/2009 | Ryan |
| 7,610,279 B2 | 10/2009 | Budzik |
| 7,617,199 B2 | 11/2009 | Budzik |
| 7,617,200 B2 | 11/2009 | Budzik |
| 7,627,565 B2 | 12/2009 | Budzik |
| 7,644,072 B2 | 1/2010 | Budzik |
| 7,657,518 B2 | 2/2010 | Budzik |
| 7,716,116 B2 | 5/2010 | Schiller |
| 7,756,810 B2 | 7/2010 | Nelken |
| 7,778,895 B1 | 8/2010 | Baxter |
| 7,818,329 B2 | 10/2010 | Campbell |
| 7,818,676 B2 | 10/2010 | Baker |
| 7,825,929 B2 | 11/2010 | Kincaid |
| 7,836,010 B2 | 11/2010 | Hammond |
| 7,840,448 B2 | 11/2010 | Musgrove |
| 7,856,390 B2 | 12/2010 | Schiller |
| 7,865,496 B1 | 1/2011 | Schiller |
| 7,930,169 B2 | 4/2011 | Billerey-Mosier |
| 8,027,941 B2 | 9/2011 | Probst |
| 8,046,226 B2 | 10/2011 | Soble |
| 8,055,608 B1 | 11/2011 | Rehling |
| 8,190,423 B2 | 5/2012 | Rehberg |
| 8,311,863 B1 | 11/2012 | Kemp |
| 8,355,903 B1 | 1/2013 | Birnbaum |
| 8,355,904 B2 | 1/2013 | Lee |
| 8,374,848 B1 | 2/2013 | Birnbaum |
| 8,442,940 B1 | 5/2013 | Faletti |
| 8,447,604 B1 | 5/2013 | Chang |
| 8,458,154 B2 | 6/2013 | Eden |
| 8,463,695 B2 | 6/2013 | Schiller |
| 8,468,244 B2 | 6/2013 | Redlich |
| 8,494,944 B2 | 7/2013 | Schiller |
| 8,495,002 B2 | 7/2013 | Nelken |
| 8,515,737 B2 | 8/2013 | Allen |
| 8,612,208 B2 | 12/2013 | Cooper |
| 8,630,844 B1 | 1/2014 | Nichols |
| 8,630,912 B2 | 1/2014 | Seki |
| 8,630,919 B2 | 1/2014 | Baran |
| 8,645,124 B2 | 2/2014 | Karov Zangvil |
| 8,645,825 B1 | 2/2014 | Cornea |
| 8,661,001 B2 | 2/2014 | Eliashberg |
| 8,676,691 B2 | 3/2014 | Schiller |
| 8,688,434 B1 | 4/2014 | Birnbaum |
| 8,751,563 B1 | 6/2014 | Warden |
| 8,752,134 B2 | 6/2014 | Ma |
| 8,762,133 B2 | 6/2014 | Reiter |
| 8,762,134 B2 | 6/2014 | Reiter |
| 8,762,285 B2 | 6/2014 | Davis |
| 8,775,161 B1 | 7/2014 | Nichols |
| 8,812,311 B2 | 8/2014 | Weber |
| 8,819,001 B1 | 8/2014 | Zhang |
| 8,843,363 B2 | 9/2014 | Birnbaum |
| 8,886,520 B1 | 11/2014 | Nichols |
| 8,892,417 B1 | 11/2014 | Nichols |
| 8,892,419 B2 | 11/2014 | Lundberg |
| 8,903,711 B2 | 12/2014 | Lundberg |
| 8,909,645 B2 | 12/2014 | Eden |
| 8,977,953 B1 | 3/2015 | Pierre |
| 9,037,583 B2 | 5/2015 | Nitesh |
| 9,047,283 B1 | 6/2015 | Zhang |
| 9,111,534 B1 | 8/2015 | Sylvester |
| 9,135,244 B2 | 9/2015 | Reiter |
| 9,164,982 B1 | 10/2015 | Kaeser |
| 9,208,147 B1 | 12/2015 | Nichols |
| 9,244,894 B1 | 1/2016 | Dale |
| 9,251,134 B2 | 2/2016 | Birnbaum |
| 9,323,743 B2 | 4/2016 | Reiter |
| 9,336,193 B2 | 5/2016 | Logan |
| 9,342,588 B2 | 5/2016 | Balchandran |
| 9,348,815 B1 | 5/2016 | Estes |
| 9,355,093 B2 | 5/2016 | Reiter |
| 9,396,168 B2 | 7/2016 | Birnbaum |
| 9,396,181 B1 | 7/2016 | Sripada |
| 9,396,758 B2 | 7/2016 | Oz |
| 9,405,448 B2 | 8/2016 | Reiter |
| 9,424,254 B2 | 8/2016 | Howald |
| 9,430,557 B2 | 8/2016 | Bhat |
| 9,460,075 B2 | 10/2016 | Mungi |
| 9,473,637 B1 | 10/2016 | Venkatapathy |
| 9,483,520 B1 | 11/2016 | Reiner |
| 9,507,867 B2 | 11/2016 | Johns |
| 9,529,795 B2 | 12/2016 | Kondadadi |
| 9,535,902 B1 | 1/2017 | Michalak |
| 9,536,049 B2 | 1/2017 | Brown |
| 9,569,729 B1 | 2/2017 | Oehrle |
| 9,576,009 B1 | 2/2017 | Hammond |
| 9,594,756 B2 | 3/2017 | Sabharwal |
| 9,630,912 B2 | 4/2017 | Li |
| 9,665,259 B2 | 5/2017 | Lee |
| 9,697,178 B1 | 7/2017 | Nichols |
| 9,697,192 B1 | 7/2017 | Estes |
| 9,697,197 B1 | 7/2017 | Birnbaum |
| 9,697,492 B1 | 7/2017 | Birnbaum |
| 9,720,884 B2 | 8/2017 | Birnbaum |
| 9,720,899 B1 | 8/2017 | Birnbaum |
| 9,741,151 B2 | 8/2017 | Breedvelt-Schouten |
| 9,767,145 B2 | 9/2017 | Prophete |
| 9,773,166 B1 | 9/2017 | Connor |
| 9,792,277 B2 | 10/2017 | Srinivasan |
| 9,870,362 B2 | 1/2018 | Lee |
| 9,870,629 B2 | 1/2018 | Cardno |
| 9,875,494 B2 | 1/2018 | Kalns |
| 9,910,914 B1 | 3/2018 | Cowley |
| 9,946,711 B2 | 4/2018 | Reiter |
| 9,971,967 B2 | 5/2018 | Bufe, III |
| 9,977,773 B1 | 5/2018 | Birnbaum |
| 9,990,337 B2 | 6/2018 | Birnbaum |
| 10,019,512 B2 | 7/2018 | Boyle |
| 10,031,901 B2 | 7/2018 | Chakra |
| 10,037,377 B2 | 7/2018 | Boyle |
| 10,049,152 B2 | 8/2018 | Ajmera |
| 10,068,185 B2 | 9/2018 | Amershi |
| 10,073,840 B2 | 9/2018 | Hakkani-Tur |
| 10,073,861 B2 | 9/2018 | Shamir |
| 10,095,692 B2 | 10/2018 | Song |
| 10,101,889 B2 | 10/2018 | Prophete |
| 10,115,108 B1 | 10/2018 | Gendelev |

(56) References Cited

U.S. PATENT DOCUMENTS

| | | |
|---|---|---|
| 10,162,900 B1 | 12/2018 | Chatterjee |
| 10,185,477 B1 | 1/2019 | Paley |
| 10,268,678 B2 | 4/2019 | Qiu |
| 10,332,297 B1 | 6/2019 | Vadodaria |
| 10,339,423 B1 | 7/2019 | Dinerstein |
| 10,387,970 B1 | 8/2019 | Wang |
| 10,416,841 B2 | 9/2019 | Riche |
| 10,482,381 B2 | 11/2019 | Nichols |
| 10,489,488 B2 | 11/2019 | Birnbaum |
| 10,565,308 B2 | 2/2020 | Reiter |
| 10,572,606 B1 | 2/2020 | Paley |
| 10,579,835 B1 | 3/2020 | Phillips |
| 10,585,983 B1 | 3/2020 | Paley |
| 10,599,767 B1 | 3/2020 | Mattera |
| 10,599,885 B2 | 3/2020 | Galitsky |
| 10,606,953 B2 | 3/2020 | Mulwad |
| 10,621,183 B1 | 4/2020 | Chatterjee |
| 10,657,201 B1 | 5/2020 | Nichols |
| 10,679,011 B2 | 6/2020 | Galitsky |
| 10,698,585 B2 | 6/2020 | Kraljic |
| 10,699,079 B1 | 6/2020 | Paley |
| 10,706,045 B1 | 7/2020 | Hasija |
| 10,706,236 B1 | 7/2020 | Platt |
| 10,706,428 B2 | 7/2020 | Crites |
| 10,713,442 B1 | 7/2020 | Paley |
| 10,719,542 B1 | 7/2020 | Paley |
| 10,726,061 B2 | 7/2020 | Chu |
| 10,726,338 B2 | 7/2020 | Byron |
| 10,747,823 B1 | 8/2020 | Birnbaum |
| 10,755,042 B2 | 8/2020 | Birnbaum |
| 10,755,046 B1 | 8/2020 | Lewis Meza |
| 10,755,053 B1 | 8/2020 | Paley |
| 10,762,304 B1 | 9/2020 | Paley |
| 10,810,260 B2 | 10/2020 | Chen |
| 10,853,583 B1 | 12/2020 | Platt |
| 10,943,069 B1 | 3/2021 | Paley |
| 10,956,656 B2 | 3/2021 | Birnbaum |
| 10,963,493 B1 | 3/2021 | Hu |
| 10,963,649 B1 | 3/2021 | Sippel |
| 10,990,767 B1 * | 4/2021 | Smathers .............. G06F 16/322 |
| 11,003,866 B1 | 5/2021 | Sippel |
| 11,023,689 B1 | 6/2021 | Sippel |
| 11,030,408 B1 | 6/2021 | Lewis Meza |
| 11,030,697 B2 | 6/2021 | Erard |
| 11,037,342 B1 | 6/2021 | Agnew |
| 11,042,708 B1 | 6/2021 | Pham |
| 11,042,709 B1 | 6/2021 | Pham |
| 11,042,713 B1 | 6/2021 | Platt |
| 11,055,497 B2 | 7/2021 | Noh |
| 11,068,661 B1 | 7/2021 | Nichols |
| 11,074,286 B2 | 7/2021 | Byron |
| 11,126,798 B1 | 9/2021 | Lewis Meza |
| 11,144,838 B1 | 10/2021 | Platt |
| 11,170,038 B1 | 11/2021 | Platt |
| 11,182,556 B1 | 11/2021 | Lewis Meza |
| 11,188,588 B1 | 11/2021 | Platt |
| 11,222,184 B1 | 1/2022 | Platt |
| 11,232,268 B1 | 1/2022 | Platt |
| 11,232,270 B1 | 1/2022 | Platt |
| 11,238,090 B1 | 2/2022 | Platt |
| 11,270,211 B2 | 3/2022 | Ramos |
| 11,288,328 B1 | 3/2022 | Birnbaum |
| 11,334,726 B1 | 5/2022 | Platt |
| 11,341,330 B1 | 5/2022 | Smathers |
| 11,341,338 B1 | 5/2022 | Platt |
| 11,392,773 B1 | 7/2022 | Gangadharaiah |
| 11,475,076 B2 | 10/2022 | Birnbaum |
| 11,501,220 B2 | 11/2022 | Birnbaum |
| 11,521,079 B2 | 12/2022 | Nichols |
| 11,561,684 B1 | 1/2023 | Paley |
| 11,561,986 B1 | 1/2023 | Sippel |
| 11,562,146 B2 | 1/2023 | Paley |
| 11,568,148 B1 | 1/2023 | Nichols |
| 11,670,288 B1 | 6/2023 | Das |
| 11,741,301 B2 | 8/2023 | Birnbaum |
| 11,954,445 B2 | 4/2024 | Nichols |
| 2002/0046018 A1 | 4/2002 | Marcu |
| 2002/0083025 A1 | 6/2002 | Robarts |
| 2002/0099730 A1 | 7/2002 | Brown |
| 2002/0107721 A1 | 8/2002 | Darwent |
| 2003/0004706 A1 | 1/2003 | Yale |
| 2003/0061029 A1 | 3/2003 | Shaket |
| 2003/0084066 A1 | 5/2003 | Waterman |
| 2003/0110186 A1 | 6/2003 | Markowski |
| 2003/0182102 A1 | 9/2003 | Corston-Oliver |
| 2003/0212543 A1 | 11/2003 | Epstein |
| 2003/0216905 A1 | 11/2003 | Chelba |
| 2003/0217335 A1 | 11/2003 | Chung |
| 2004/0015342 A1 | 1/2004 | Garst |
| 2004/0029977 A1 | 2/2004 | Kawa |
| 2004/0034520 A1 | 2/2004 | Langkilde-Geary |
| 2004/0068691 A1 | 4/2004 | Asbury |
| 2004/0083092 A1 | 4/2004 | Valles |
| 2004/0093557 A1 | 5/2004 | Kawatani |
| 2004/0103116 A1 | 5/2004 | Palanisamy |
| 2004/0138899 A1 | 7/2004 | Birnbaum |
| 2004/0174397 A1 | 9/2004 | Cereghini |
| 2004/0225651 A1 | 11/2004 | Musgrove |
| 2004/0230989 A1 | 11/2004 | Macey |
| 2004/0255232 A1 | 12/2004 | Hammond |
| 2005/0027704 A1 | 2/2005 | Hammond |
| 2005/0028156 A1 | 2/2005 | Hammond |
| 2005/0033582 A1 | 2/2005 | Gadd |
| 2005/0049852 A1 | 3/2005 | Chao |
| 2005/0125213 A1 | 6/2005 | Chen |
| 2005/0137854 A1 | 6/2005 | Cancedda |
| 2005/0223021 A1 | 10/2005 | Batra |
| 2005/0273362 A1 | 12/2005 | Harris |
| 2006/0031182 A1 | 2/2006 | Ryan |
| 2006/0074634 A1 | 4/2006 | Gao |
| 2006/0100852 A1 | 5/2006 | Gamon |
| 2006/0101335 A1 | 5/2006 | Pisciottano |
| 2006/0155662 A1 | 7/2006 | Murakami |
| 2006/0165040 A1 | 7/2006 | Rathod |
| 2006/0181531 A1 | 8/2006 | Goldschmidt |
| 2006/0212446 A1 | 9/2006 | Hammond |
| 2006/0218485 A1 | 9/2006 | Blumenthal |
| 2006/0224570 A1 | 10/2006 | Quiroga |
| 2006/0241936 A1 | 10/2006 | Katae |
| 2006/0253431 A1 | 11/2006 | Bobick |
| 2006/0253783 A1 | 11/2006 | Vronay |
| 2006/0271535 A1 | 11/2006 | Hammond |
| 2006/0277168 A1 | 12/2006 | Hammond |
| 2007/0132767 A1 | 6/2007 | Wright |
| 2007/0136657 A1 | 6/2007 | Blumenthal |
| 2007/0185846 A1 | 8/2007 | Budzik |
| 2007/0185847 A1 | 8/2007 | Budzik |
| 2007/0185861 A1 | 8/2007 | Budzik |
| 2007/0185862 A1 | 8/2007 | Budzik |
| 2007/0185863 A1 | 8/2007 | Budzik |
| 2007/0185864 A1 | 8/2007 | Budzik |
| 2007/0185865 A1 | 8/2007 | Budzik |
| 2007/0250479 A1 | 10/2007 | Lunt |
| 2007/0250826 A1 | 10/2007 | O'Brien |
| 2007/0294201 A1 | 12/2007 | Nelken |
| 2008/0005677 A1 | 1/2008 | Thompson |
| 2008/0140696 A1 | 6/2008 | Mathuria |
| 2008/0198156 A1 | 8/2008 | Jou |
| 2008/0243285 A1 | 10/2008 | Reichhart |
| 2008/0250070 A1 | 10/2008 | Abdulla |
| 2008/0256066 A1 | 10/2008 | Zuckerman |
| 2008/0304808 A1 | 12/2008 | Newell |
| 2008/0306882 A1 | 12/2008 | Schiller |
| 2008/0312904 A1 | 12/2008 | Balchandran |
| 2008/0312906 A1 | 12/2008 | Balchandran |
| 2008/0313130 A1 | 12/2008 | Hammond |
| 2009/0019013 A1 | 1/2009 | Tareen |
| 2009/0030899 A1 | 1/2009 | Tareen |
| 2009/0049038 A1 | 2/2009 | Gross |
| 2009/0049041 A1 | 2/2009 | Tareen |
| 2009/0055164 A1 | 2/2009 | Hu |
| 2009/0083288 A1 | 3/2009 | Ledain |
| 2009/0089100 A1 | 4/2009 | Nenov |
| 2009/0116755 A1 | 5/2009 | Neogi |

(56) References Cited

U.S. PATENT DOCUMENTS

| | | |
|---|---|---|
| 2009/0119095 A1 | 5/2009 | Beggelman |
| 2009/0119584 A1 | 5/2009 | Herbst |
| 2009/0144608 A1 | 6/2009 | Oisel |
| 2009/0144609 A1 | 6/2009 | Liang |
| 2009/0150156 A1 | 6/2009 | Kennewick |
| 2009/0157664 A1 | 6/2009 | Wen |
| 2009/0175545 A1 | 7/2009 | Cancedda |
| 2009/0187556 A1 | 7/2009 | Ross |
| 2009/0248399 A1 | 10/2009 | Au |
| 2009/0254572 A1 | 10/2009 | Redlich |
| 2010/0043057 A1 | 2/2010 | Di Battista |
| 2010/0075281 A1 | 3/2010 | Smith |
| 2010/0082325 A1 | 4/2010 | Smith |
| 2010/0146393 A1 | 6/2010 | Land |
| 2010/0161541 A1 | 6/2010 | Covannon |
| 2010/0185984 A1 | 7/2010 | Wright |
| 2010/0228693 A1 | 9/2010 | Dawson |
| 2010/0241620 A1 | 9/2010 | Manister |
| 2010/0250497 A1 | 9/2010 | Redlich |
| 2010/0325107 A1 | 12/2010 | Kenton |
| 2011/0022941 A1 | 1/2011 | Osborne |
| 2011/0029532 A1 | 2/2011 | Knight |
| 2011/0040837 A1 | 2/2011 | Eden |
| 2011/0044447 A1 | 2/2011 | Morris |
| 2011/0077958 A1 | 3/2011 | Breitenstein |
| 2011/0078105 A1 | 3/2011 | Wallace |
| 2011/0087486 A1 | 4/2011 | Schiller |
| 2011/0099184 A1 | 4/2011 | Symington |
| 2011/0113315 A1 | 5/2011 | Datha |
| 2011/0113334 A1 | 5/2011 | Joy |
| 2011/0182283 A1 | 7/2011 | Van Buren |
| 2011/0191417 A1 | 8/2011 | Rathod |
| 2011/0213642 A1 | 9/2011 | Makar |
| 2011/0246182 A1 | 10/2011 | Allen |
| 2011/0249953 A1 | 10/2011 | Suri |
| 2011/0261049 A1 | 10/2011 | Cardno |
| 2011/0288852 A1 | 11/2011 | Dymetman |
| 2011/0295595 A1 | 12/2011 | Cao |
| 2011/0295903 A1 | 12/2011 | Chen |
| 2011/0307435 A1 | 12/2011 | Overell |
| 2011/0311144 A1 | 12/2011 | Tardif |
| 2011/0314381 A1 | 12/2011 | Fuller |
| 2012/0011428 A1 | 1/2012 | Chisholm |
| 2012/0041903 A1 | 2/2012 | Beilby |
| 2012/0069131 A1 | 3/2012 | Abelow |
| 2012/0078911 A1 | 3/2012 | Johnston |
| 2012/0109637 A1 | 5/2012 | Merugu |
| 2012/0143849 A1 | 6/2012 | Wong |
| 2012/0158850 A1 | 6/2012 | Harrison |
| 2012/0166180 A1 | 6/2012 | Au |
| 2012/0203623 A1 | 8/2012 | Sethi |
| 2012/0265531 A1 | 10/2012 | Bennett |
| 2012/0291007 A1 | 11/2012 | Bagheri |
| 2012/0310699 A1 | 12/2012 | McKenna |
| 2013/0013289 A1 | 1/2013 | Myaeng |
| 2013/0041677 A1 | 2/2013 | Nusimow |
| 2013/0091031 A1 | 4/2013 | Baran |
| 2013/0096947 A1 | 4/2013 | Shah |
| 2013/0138430 A1 | 5/2013 | Eden |
| 2013/0144605 A1 | 6/2013 | Brager |
| 2013/0144606 A1 | 6/2013 | Birnbaum |
| 2013/0145242 A1 | 6/2013 | Birnbaum |
| 2013/0173285 A1 | 7/2013 | Hyde |
| 2013/0174026 A1 | 7/2013 | Locke |
| 2013/0185049 A1 | 7/2013 | Zhao |
| 2013/0185051 A1 | 7/2013 | Buryak |
| 2013/0187926 A1 | 7/2013 | Silverstein |
| 2013/0211855 A1 | 8/2013 | Eberle |
| 2013/0226559 A1 | 8/2013 | Lim |
| 2013/0238316 A1 | 9/2013 | Shastri |
| 2013/0238330 A1 | 9/2013 | Casella Dos Santos |
| 2013/0246300 A1 | 9/2013 | Fischer |
| 2013/0246934 A1 | 9/2013 | Wade |
| 2013/0253910 A1 | 9/2013 | Turner |
| 2013/0262086 A1 | 10/2013 | Kim |
| 2013/0262092 A1* | 10/2013 | Wasick .................. G06F 40/40 704/9 |
| 2013/0268490 A1 | 10/2013 | Keebler |
| 2013/0268534 A1 | 10/2013 | Mathew |
| 2013/0275121 A1 | 10/2013 | Tunstall-Pedoe |
| 2013/0304507 A1 | 11/2013 | Dail |
| 2013/0316834 A1 | 11/2013 | Vogel |
| 2014/0006012 A1 | 1/2014 | Zhou |
| 2014/0040312 A1 | 2/2014 | Gorman |
| 2014/0046891 A1 | 2/2014 | Banas |
| 2014/0059443 A1 | 2/2014 | Tabe |
| 2014/0062712 A1 | 3/2014 | Reiter |
| 2014/0075004 A1 | 3/2014 | Van Dusen |
| 2014/0100844 A1 | 4/2014 | Stieglitz |
| 2014/0114489 A1 | 4/2014 | Duff |
| 2014/0129213 A1 | 5/2014 | Kimelfeld |
| 2014/0129942 A1 | 5/2014 | Rathod |
| 2014/0134590 A1 | 5/2014 | Hiscock, Jr. |
| 2014/0149107 A1 | 5/2014 | Schilder |
| 2014/0163962 A1 | 6/2014 | Castelli |
| 2014/0164978 A1 | 6/2014 | Deeter |
| 2014/0173425 A1 | 6/2014 | Hailpern |
| 2014/0200878 A1 | 7/2014 | Mylonakis |
| 2014/0200891 A1 | 7/2014 | Larcheveque |
| 2014/0201202 A1 | 7/2014 | Jones |
| 2014/0208215 A1 | 7/2014 | Deshpande |
| 2014/0282184 A1 | 9/2014 | Dewan |
| 2014/0310002 A1 | 10/2014 | Nitz |
| 2014/0314225 A1 | 10/2014 | Riahi |
| 2014/0322677 A1 | 10/2014 | Segal |
| 2014/0351281 A1 | 11/2014 | Tunstall-Pedoe |
| 2014/0356833 A1 | 12/2014 | Sabczynski |
| 2014/0372850 A1 | 12/2014 | Campbell |
| 2014/0375466 A1 | 12/2014 | Reiter |
| 2015/0019540 A1 | 1/2015 | Ganjam |
| 2015/0032730 A1 | 1/2015 | Cialdea, Jr. |
| 2015/0039537 A1 | 2/2015 | Peev |
| 2015/0049951 A1 | 2/2015 | Chaturvedi |
| 2015/0078232 A1 | 3/2015 | Djinki |
| 2015/0088808 A1 | 3/2015 | Tyagi |
| 2015/0120738 A1 | 4/2015 | Srinivasan |
| 2015/0134694 A1 | 5/2015 | Burke |
| 2015/0142704 A1 | 5/2015 | London |
| 2015/0161997 A1 | 6/2015 | Wetsel |
| 2015/0169548 A1 | 6/2015 | Reiter |
| 2015/0178386 A1 | 6/2015 | Oberkampf |
| 2015/0186504 A1 | 7/2015 | Gorman |
| 2015/0199339 A1 | 7/2015 | Mirkin |
| 2015/0227508 A1 | 8/2015 | Howald |
| 2015/0227588 A1 | 8/2015 | Shapira |
| 2015/0242384 A1 | 8/2015 | Reiter |
| 2015/0249584 A1 | 9/2015 | Cherifi |
| 2015/0261745 A1 | 9/2015 | Song |
| 2015/0268930 A1 | 9/2015 | Lee |
| 2015/0286630 A1 | 10/2015 | Bateman |
| 2015/0286747 A1 | 10/2015 | Anastasakos |
| 2015/0324347 A1 | 11/2015 | Bradshaw |
| 2015/0324351 A1 | 11/2015 | Sripada |
| 2015/0324374 A1 | 11/2015 | Sripada |
| 2015/0325000 A1 | 11/2015 | Sripada |
| 2015/0331846 A1 | 11/2015 | Guggilla |
| 2015/0331850 A1 | 11/2015 | Ramish |
| 2015/0332665 A1 | 11/2015 | Mishra |
| 2015/0339284 A1 | 11/2015 | Ban |
| 2015/0347391 A1 | 12/2015 | Chen |
| 2015/0347400 A1 | 12/2015 | Sripada |
| 2015/0347901 A1 | 12/2015 | Cama |
| 2015/0356463 A1 | 12/2015 | Overell |
| 2015/0356967 A1 | 12/2015 | Byron |
| 2015/0363364 A1 | 12/2015 | Sripada |
| 2015/0365447 A1 | 12/2015 | Klein |
| 2015/0370778 A1 | 12/2015 | Tremblay |
| 2016/0019200 A1 | 1/2016 | Allen |
| 2016/0026253 A1 | 1/2016 | Bradski |
| 2016/0027125 A1 | 1/2016 | Bryce |
| 2016/0054889 A1 | 2/2016 | Hadley |
| 2016/0062604 A1 | 3/2016 | Kraljic |
| 2016/0062954 A1 | 3/2016 | Ruff |
| 2016/0078022 A1 | 3/2016 | Lisuk |

(56) References Cited

U.S. PATENT DOCUMENTS

| | | |
|---|---|---|
| 2016/0086084 A1 | 3/2016 | Nichols |
| 2016/0103559 A1 | 4/2016 | Maheshwari |
| 2016/0132489 A1 | 5/2016 | Reiter |
| 2016/0140090 A1 | 5/2016 | Dale |
| 2016/0155067 A1 | 6/2016 | Dubnov |
| 2016/0162445 A1 | 6/2016 | Birnbaum |
| 2016/0162582 A1 | 6/2016 | Chatterjee |
| 2016/0162803 A1 | 6/2016 | Amershi |
| 2016/0196491 A1 | 7/2016 | Chandrasekaran |
| 2016/0217133 A1 | 7/2016 | Reiter |
| 2016/0232152 A1 | 8/2016 | Mahamood |
| 2016/0232221 A1 | 8/2016 | McCloskey |
| 2016/0314121 A1 | 10/2016 | Arroyo |
| 2016/0314123 A1 | 10/2016 | Ramachandran |
| 2016/0328365 A1 | 11/2016 | Birnbaum |
| 2016/0379132 A1 | 12/2016 | Jin |
| 2017/0004415 A1 | 1/2017 | Moretti |
| 2017/0006135 A1 | 1/2017 | Siebel |
| 2017/0011742 A1 | 1/2017 | Jing |
| 2017/0017897 A1 | 1/2017 | Bugay |
| 2017/0024465 A1 | 1/2017 | Yeh |
| 2017/0026705 A1 | 1/2017 | Yeh |
| 2017/0039275 A1 | 2/2017 | Akolkar |
| 2017/0046016 A1 | 2/2017 | Riche |
| 2017/0060857 A1 | 3/2017 | Imbruce |
| 2017/0061093 A1 | 3/2017 | Amarasingham |
| 2017/0068551 A1 | 3/2017 | Vadodaria |
| 2017/0083484 A1 | 3/2017 | Patil |
| 2017/0091291 A1 | 3/2017 | Bostick |
| 2017/0104785 A1 | 4/2017 | Stolfo |
| 2017/0116327 A1 | 4/2017 | Gorelick |
| 2017/0124062 A1 | 5/2017 | Bhaowal |
| 2017/0125015 A1 | 5/2017 | Dielmann |
| 2017/0131975 A1 | 5/2017 | Balasubramanian |
| 2017/0140405 A1 | 5/2017 | Gottemukkala |
| 2017/0161242 A1* | 6/2017 | Clark .................. G06F 40/151 |
| 2017/0177559 A1 | 6/2017 | Dang |
| 2017/0177660 A1 | 6/2017 | Chang |
| 2017/0177715 A1 | 6/2017 | Chang |
| 2017/0185674 A1 | 6/2017 | Tonkin |
| 2017/0199928 A1 | 7/2017 | Zhao |
| 2017/0206890 A1 | 7/2017 | Tapuhi |
| 2017/0212671 A1 | 7/2017 | Sathish |
| 2017/0213157 A1 | 7/2017 | Bugay |
| 2017/0228372 A1 | 8/2017 | Moreno |
| 2017/0228659 A1 | 8/2017 | Lin |
| 2017/0242886 A1 | 8/2017 | Jolley |
| 2017/0270105 A1 | 9/2017 | Ninan |
| 2017/0286377 A1 | 10/2017 | Chakra |
| 2017/0293864 A1 | 10/2017 | Oh |
| 2017/0329842 A1 | 11/2017 | Ng Tari |
| 2017/0339089 A1 | 11/2017 | Longdale |
| 2017/0344518 A1 | 11/2017 | Birnbaum |
| 2017/0358295 A1 | 12/2017 | Roux |
| 2017/0371856 A1 | 12/2017 | Can |
| 2018/0008894 A1 | 1/2018 | Sack |
| 2018/0024989 A1 | 1/2018 | Bharti |
| 2018/0025726 A1 | 1/2018 | Gatti De Bayser |
| 2018/0060759 A1 | 3/2018 | Chu |
| 2018/0075368 A1 | 3/2018 | Brennan |
| 2018/0081869 A1 | 3/2018 | Hager |
| 2018/0082184 A1 | 3/2018 | Guo |
| 2018/0089177 A1 | 3/2018 | Cho |
| 2018/0114158 A1 | 4/2018 | Foubert |
| 2018/0129721 A1 | 5/2018 | Apple |
| 2018/0181613 A1 | 6/2018 | Acharya |
| 2018/0189284 A1 | 7/2018 | Hosabettu |
| 2018/0232443 A1 | 8/2018 | Delgo |
| 2018/0232487 A1 | 8/2018 | Erard |
| 2018/0232493 A1 | 8/2018 | Erard |
| 2018/0232812 A1 | 8/2018 | Erard |
| 2018/0234442 A1 | 8/2018 | Luo |
| 2018/0260380 A1 | 9/2018 | Birnbaum |
| 2018/0261203 A1 | 9/2018 | Zoller |
| 2018/0285324 A1 | 10/2018 | Birnbaum |
| 2018/0293483 A1 | 10/2018 | Abramson |
| 2018/0300311 A1 | 10/2018 | Krishnamurthy |
| 2018/0314689 A1 | 11/2018 | Wang |
| 2018/0373999 A1 | 12/2018 | Xu |
| 2019/0042559 A1 | 2/2019 | Allen |
| 2019/0056913 A1 | 2/2019 | Jaroch |
| 2019/0095499 A1 | 3/2019 | Payne |
| 2019/0102614 A1 | 4/2019 | Winder |
| 2019/0114304 A1 | 4/2019 | Oliveira |
| 2019/0121918 A1 | 4/2019 | Fort |
| 2019/0138615 A1 | 5/2019 | Huh |
| 2019/0147849 A1 | 5/2019 | Talwar |
| 2019/0179893 A1 | 6/2019 | Mulwad |
| 2019/0197097 A1 | 6/2019 | Nagarajan |
| 2019/0213254 A1 | 7/2019 | Ray |
| 2019/0236140 A1 | 8/2019 | Canim |
| 2019/0267118 A1 | 8/2019 | Miled |
| 2019/0272827 A1 | 9/2019 | Vozila |
| 2019/0286741 A1 | 9/2019 | Agarwal |
| 2019/0312968 A1 | 10/2019 | Moon |
| 2019/0317994 A1 | 10/2019 | Singh |
| 2019/0332666 A1 | 10/2019 | Dadachev |
| 2019/0332667 A1 | 10/2019 | Williams |
| 2019/0347553 A1 | 11/2019 | Lo |
| 2019/0370084 A1 | 12/2019 | Behar |
| 2019/0370696 A1 | 12/2019 | Ezen Can |
| 2019/0377790 A1 | 12/2019 | Redmond |
| 2020/0019370 A1* | 1/2020 | Doggett .................. G10L 13/00 |
| 2020/0042646 A1 | 2/2020 | Nagaraja |
| 2020/0066391 A1 | 2/2020 | Sachdeva |
| 2020/0074013 A1 | 3/2020 | Chen |
| 2020/0074310 A1 | 3/2020 | Li |
| 2020/0074401 A1 | 3/2020 | Oliveira Almeida |
| 2020/0081939 A1 | 3/2020 | Subramaniam |
| 2020/0082276 A1 | 3/2020 | Nichols |
| 2020/0089735 A1 | 3/2020 | Birnbaum |
| 2020/0110902 A1 | 4/2020 | Zakour |
| 2020/0134032 A1 | 4/2020 | Lin |
| 2020/0134090 A1* | 4/2020 | Mankovskii ......... G06V 10/762 |
| 2020/0143468 A1 | 5/2020 | Riley |
| 2020/0151443 A1 | 5/2020 | Florencio |
| 2020/0160190 A1 | 5/2020 | Swamy |
| 2020/0202846 A1 | 6/2020 | Bapna |
| 2020/0279072 A1 | 9/2020 | Nichols |
| 2020/0302393 A1 | 9/2020 | Gupta |
| 2020/0334299 A1 | 10/2020 | Birnbaum |
| 2020/0334300 A1 | 10/2020 | Birnbaum |
| 2020/0334418 A1 | 10/2020 | Platt |
| 2020/0379780 A1 | 12/2020 | Sutton |
| 2020/0387666 A1 | 12/2020 | Birnbaum |
| 2020/0401770 A1* | 12/2020 | Paley .................. G06F 40/295 |
| 2021/0081499 A1 | 3/2021 | Rakshit |
| 2021/0192132 A1 | 6/2021 | Birnbaum |
| 2021/0192144 A1 | 6/2021 | Paley |
| 2021/0209168 A1 | 7/2021 | Oswald |
| 2021/0256221 A1 | 8/2021 | Beaugh |
| 2021/0271824 A1 | 9/2021 | Pham |
| 2021/0279425 A1 | 9/2021 | Horowitz |
| 2021/0375289 A1 | 12/2021 | Zhu |
| 2022/0092508 A1* | 3/2022 | Suthan .................. G06F 16/26 |
| 2022/0114206 A1 | 4/2022 | Platt |
| 2022/0115137 A1 | 4/2022 | Goldstein |
| 2022/0223146 A1 | 7/2022 | Aili |
| 2022/0269354 A1 | 8/2022 | Prasad |
| 2022/0284195 A1 | 9/2022 | Platt |
| 2022/0321511 A1 | 10/2022 | Hansmann |
| 2022/0414228 A1 | 12/2022 | Difonzo |
| 2023/0027421 A1 | 1/2023 | Birnbaum |
| 2023/0053724 A1 | 2/2023 | Birnbaum |
| 2023/0109572 A1 | 4/2023 | Nichols |
| 2023/0206006 A1 | 6/2023 | Nichols |

FOREIGN PATENT DOCUMENTS

| | | |
|---|---|---|
| WO | 2014035400 A1 | 3/2014 |
| WO | 2014035402 A1 | 3/2014 |
| WO | 2014035403 A1 | 3/2014 |
| WO | 2014035406 A1 | 3/2014 |
| WO | 2014035407 A1 | 3/2014 |

(56) References Cited

FOREIGN PATENT DOCUMENTS

| WO | 2014035447 A1 | 3/2014 |
|---|---|---|
| WO | 2014070197 A1 | 5/2014 |
| WO | 2014076524 A1 | 5/2014 |
| WO | 2014076525 A1 | 5/2014 |
| WO | 2014102568 A1 | 7/2014 |
| WO | 2014102569 A1 | 7/2014 |
| WO | 2014111753 A1 | 7/2014 |
| WO | 2015028844 A1 | 3/2015 |
| WO | 2015159133 A1 | 10/2015 |

OTHER PUBLICATIONS

Allen et al., "StatsMonkey: A Data-Driven Sports Narrative Writer", Computational Models of Narrative: Papers from the AAII Fall Symposium, Nov. 2010, 2 pages.

Andersen, P., Hayes, P., Huettner, A., Schmandt, L, Nirenburg, I., and Weinstein, S. (1992). Automatic extraction of facts from press releases to generate news stories. In Proceedings of the third conference on Applied natural language processing. (Trento, Italy). ACM Press, New York, NY170-177.

Andre, E., Herzog, G., & Rist, T. (1988). On the simultaneous interpretation of real world image sequences and their natural language description: the system SOCCER. Paper presented at Proceedings of the 8th. European Conference on Artificial Intelligence (ECAI)Munich. 13 pages.

Asset Economics, Inc. (Feb. 11, 2011) 1 page.

Bailey, P. (1999). Searching for Storiness: Story-Generation from a Reader's Perspective. AAAI Technical Report FS-99-01. 7 pages.

Bethem, T., Burton, J,, Caldwell, T,, Evans, M., Kittredge, R., Lavoie, B., and Werner, J. (2005). Generation of Realtime Narrative Summaries for Real-time Water Levels and Meteorological Observations in PORTS®. In Proceedings of the Fourth Conference on Artificial Intelligence Applications to Environmental Sciences (AMS-2005), San Diego, California. 4 pages.

Bourbeau, L., Carcagno, D., Goldberg, E., Kittredge, R., & Polguere, A. (1990). Bilingual generation of weather forecasts in an operations environment. Paper presented at Proceedings of the 13th International Conference on Computational Linguistics (COLING), Helsinki, Finlandpp. 318-320.

Boyd, S. (1998) TREND: a system for generating intelligent descriptions of time series data. Paper presented at Proceedings of the IEEE international conference on intelligent processing systems (ICIPS-1998). 5 pages.

Character Writer Version 3.01, Typing Chimp Software LLC, 2012, screenshots from working program, pp. 1-19 (Year: 2012).

Cyganiak et al., "RDF 1.1 Concepts and Abstract Syntax", W3C Recommendation, 2014, vol. 25, No. 2. 19 pages.

Dehn, N. (1981). Story generation after TALE-SPIN. In Proceedings of the Seventh International Joint Conference on okrtificial Intelligence. (Vancouver, Canada). 3 pages.

Dramatica Pro version 4, Write Brothers, 1993-2006, user manual, 81 pages.

Englisheforums, "Direct Objects, Indirect Objects, Obliques, Dative Movement?", [online] https://www.englishforums.com, published 2007. (Year 2007).

Gamma et al., "Design Patterns: Elements of Reusable Object-Oriented Software", Addison Wesley, 1994. (Year: 1994) 272 pages.

Garbacea, Cristina and Qiaozhu Mei. "Why is constrained neural language generation particularly challenging?" ArXiv abs/ 2206.05395 (2022): n. pp. 1-22. (Year: 2022).

Gatt A. and Portet, F. (2009). Text content and task performance in the evaluation of a Natural Language Generation System. Proceedings of the Conference on Recent Advances in Natural Language Processing (RANLP-09). 6 pages.

Gatt, A., Portet, F., Reiter, E., Hunter, J., Mahamood, S., Moncur, W., and Sripada, S. (2009). From data to text in the Neonatal Intensive Care Unit: Using NLG technology for decision support and information management. AI Communications 22pp. 153-186.

Glahn, H. (1970). Computer-produced worded forecasts. Bulletin of the American Meteorological Society, 51(12), 1126-1131.

Goldberg, E., Driedger, N., & Kittredge, R. (1994). Using Natural-Language Processing to Produce Weather rorecasts. IEEE Expert, 9 (2), 45. 9 pages.

Hargood, C. Millard, D. and Weal, M. (2009) Exploring the Importance of Themes in Narrative Systems. 43 pages.

Hargood, C., Millard, D. and Weal, M. (2009). Investigating a Thematic Approach to Narrative Generation, 2009. 12 pages.

Hunter, J., Freer, Y., Gatt, A., Logie, R., McIntosh, N., van der Meulen, M., Portet, F., Reiter, E., Sripada, S., and Sykes, C. (2008). Summarising Complex ICU Data in Natural Language. AMIA 2008 Annual Symposium Proceedingspp. 323-327.

Hunter, J., Gatt, A., Portet, F., Reiter, E., and Sripada, S. (2008). Using natural language generation technology to improve information flows in intensive care units. Proceedings of the 5th Conference on Prestigious Applications of Intelligent SystemsPAIS-08. 5 pages.

Juraska et al., Characterizing Variation in Crowd-Sourced Data for Training Neural Language Generators to Produce Stylistically Varied Outputs. In Proceedings of the 11th International Conference on Natural Language Generation, pp. 441-450, Tilburg University, The Netherlands. Association (Year: 2018).

Kittredge, R., and Lavoie, B. (1998). MeteoCogent A Knowledge-Based Tool for Generating Weather Forecast Texts. In Proceedings of the American Meteorological Society AI Conference (AMS-98), Phoenix, Arizona. 5 pages.

Kittredge, R,, Polguere, A., & Goldberg, E. (1986). Synthesizing weather reports from formatted data. Paper presented at Proceedings of the 11th International Conference on Computational Linguistics, Bonn, Germany, pp. 563-565.

Kukich, K. (1983). Design of a Knowledge-Based Report Generator. Proceedings of the 21st Conference of the Kssociation for Computational Linguistics, Cambridge, MA, pp. 145-150.

Kukich, K. (1983). Knowledge-Based Report Generation: A Technique for Automatically Generating Natural Language Reports from Databases. Paper presented at Proceedings of the Sixth International ACM SIGIR Conference, Nashington, DC. 5 pages.

Mack et al., "A Framework for Metrics in Large Complex Systems", IEEE Aerospace Conference Proceedings, 2004, pp. 3217-3228, vol. 5, doi: 10.1109/AERO .2004.1368127.

Mahamood, Saad, William Bradshaw, and Ehud Reiter. "Generating annotated graphs using the nlg pipeline architecture." Proceedings of the 8th International Natural Language Generation Conference (INLG). 2014. (Year: 2014). 5 pages.

McKeown, K., Kukich, K., & Shaw, J. (1994). Practical issues in automatic documentation generation. 4th Conference pn Applied Natural Language Processing, Stuttgart, Germany, pp. 7-14.

Meehan, James R,, TALE-SPIN. (1977). An Interactive Program that Writes Stories. In Proceedings of the Fifth International Joint Conference on Artificial Intelligence. 8 pages.

Memorandum Opinion and Order for *O2Media, LLC v. Narrative Science Inc.*, Case 1:15-cv-05129 (N.D. IL), Feb. 25, 2016, 25 pages (invalidating claims of U.S. Pat. Nos. 7,856,390, 8,494,944, and 8,676,691 owned by O2 MediaLLC).

Moncur, W., and Reiter, E. (2007). How Much to Tell? Disseminating Affective Information across a Social Network. Proceedings of Second International Workshop on Personalisation for e-Health. 5 pages.

Moncur, W., Masthoff, J., Reiter, E. (2008) What Do You Want to Know? Investigating the Information Requirements ol Patient Supporters. 21st IEEE International Symposium on Computer-Based Medical Systems (CBMS 2008), pp. 443-448.

Movie Magic Screenwriter, Write Brothers, 2009, user manual, 144 pages.

Nathan Weston; "A Framework for Constructing Semantically Composable Feature Models from Natural Language Requirements"; SPLC '09: Proceedings of the 13th International Software Product Line Conference;2009;pp. 211-220 (Year: 2009).

Office Action for U.S. Appl. No. 16/744,537 dated Aug. 3, 2021. 25 pages.

Portet Reiter, E., Gatt, A., Hunter, J., Sripada, S., Freer, Y., and Sykes, C. (2009). Automatic Generation of Textual Summaries from Neonatal Intensive Care Data. Artificial Intelligence. 46 pages.

(56) References Cited

OTHER PUBLICATIONS

Portet, F., Reiter, E., Hunter, J., and Sripada, S. (2007). Automatic Generation of Textual Summaries from Neonatal Intensive Care Data. In: Bellazzi, Riccardo, Ameen Abu-Hanna and Jim Hunter (Ed.), 11th Conference on Artificial Intelligence in Medicine (AIME 07)pp. 227-236.
Prosecution History for U.S. Appl. No. 16/444,649, now U.S. Pat. No. 10,706,236, filed Jun. 18, 2019.
Reiter et al., "Building Applied Natural Language Generation Systems", Cambridge University Press, 1995, pp. 1-32.
Reiter, E. (2007). An architecture for Data-To-Text systems. In: Busemann, Stephan (Ed ), Proceedings of the 11th European Workshop on Natural Language Generation, pp. 97-104.
Reiter, E., Gatt, A., Portet, F., and van der MeulenM. (2008). The importance of narrative and other lessons from an evaluation of an NLG system that summarises clinical data Proceedings of the 5th International Conference on Natural Language Generation. 9 pages.
Reiter, E., Sripada, S., Hunter, J., Yu, J., and Davy, I. (2005). Choosing words in computer-generated weather brecasts. Artificial Intelligence167:137-169.
Riedl et al., "Narrative Planning: Balancing Plot and Character", Journal of Artificial Intelligence Research, 2010, pp. 217-268, vol. 39.
Riedl et al., "From Linear Story Generation to Branching Story Graphs", IEEE Computer Graphics and Applications, 2006, pp. 23-31.
Roberts et al., "Lessons on Using Computationally Generated Influence for Shaping Narrative Experiences", IEEE Transactions on Computational Intelligence and AI in Games, Jun. 2014, pp. 188-202, vol. 6, No. 2, doi: 10.1109/TCIAIG .2013.2287154.
Robin, J. (1996). Evaluating the portability of revision rules for incremental summary generation. Paper presented at Proceedings of the 34th. Annual Meeting of the Association for Computationa Linguistics (ACL'96), Santa Cruz, CA. 10 pages.
Rui, Y., Gupta, A., and Acero, A. 2000. Automatically extracting highlights for TV Baseball programs. In Proceedings of the eighth ACM international conference on Multimedia. (Marina del Rey, California, United States). ACM Press, New fork, NY 105-115.
Saleh et al., "A Reusable Model for Data-Centric Web Services," 2009, pp. 288-297, Springer-Verlag Berlin.
Segel et al., "Narrative Visualization: Telling Stories with Data", Stanford University, Oct. 2010, 10 pgs.
Smari et al., "An Integrated Approach to Collaborative Decision Making Using Computer-Supported Conflict Management Methodology", IEEE International Conference on Information Reuse and Integration, 2005, pp. 182-191.

Smith, "The Multivariable Method in Singular Perturbation Analysis", SIAM Review, 1975, pp. 221-273, vol. 17, No. 2.
Sourab Mangrulkar, Suhani Shrivastava, Veena Thenkanidiyoor, and Dileep Aroor Dinesh. 2018. A Context-aware Convolutional Natural Language Generation model for Dialogue Systems. In Proceedings of the 19th Annual SIGdial Meeting on Discourse and Dialogue, pp. 191-200, Melbourne, Australia. (Year: 2018).
Sripada, S., Reiter, E., and Davy, L (2003). SumTime-Mousam: Configurable Marine Weather Forecast Generator. Expert Update 6(3):4-10.
Storyview, Screenplay Systems, 2000, user manual, 188 pages.
Theune, M., Klabbers, E., Odijk, J., dePijper, J,, and Krahmer, E. (2001) "From Data to Speech: A General Approach", Natural Language Engineering 7(1): 47-86.
Thomas, K, and Sripada, S. (2008). What's in a message? Interpreting Geo-referenced Data for the Visually-impaired. Proceedings of the Int. conference on NLG. 8 pages.
Thomas, K, Sumegi, L., Ferres, L., and Sripada, S. (2008). Enabling Access to Geo-referenced Information: Atlas.txt. Proceedings of the Cross-disciplinary Conference on Web Accessibility. 4 pages.
Thomas, K., and SripadaS. (2007). Atlas.txt: Linking Geo-referenced Data to Text for NLG. Paper presented at Proceedings of the 2007 European Natural Language Generation Workshop (ENLGO7). 4 pages.
Troiano, E., Velutharambath, A. and Klinger, R. (2023) 'From theories on styles to their transfer in text: Bridging the gap with a hierarchical survey', Natural Language Engineering, 29(4), pp. 849-908. (Year: 2023).
Van der Meulen, M., Logie, R., Freer, Y., Sykes, C., McIntosh, N., and Hunter, J. (2008). When a Graph is Poorer than 100 Words: A Comparison of Computerised Natural Language Generation, Human Generated Descriptions and Sraphical Displays in Neonatal Intensive Care. Applied Cognitive Psychology. 21 pages.
Wei Lu, Hwee Tou Ng, and Wee Sun Lee. 2009. Natural Language Generation with Tree Conditional Random Fields. In Proc. of the 2009 Conference on Empirical Methods in Natural Language Processing, pp. 400-409 (Year: 2009).
Yu, J., Reiter, E., Hunter, J., and Mellish, C. (2007). Choosing the content of textual summaries of large time-series data sets. Natural Language Engineering, 13:25-49.
Yu, J., Reiter, E., Hunter, J., and Sripada, S. (2003). Sumtime-Turbine: A Knowledge-Based System to Communicate Time Series Data in the Gas Turbine Domain. In P Chung et al. (Eds) Developments in Applied Artificial Intelligence: Proceedings of IEA/AIE-2003, pp. 379-384. Springer (LNAI 2718).

\* cited by examiner

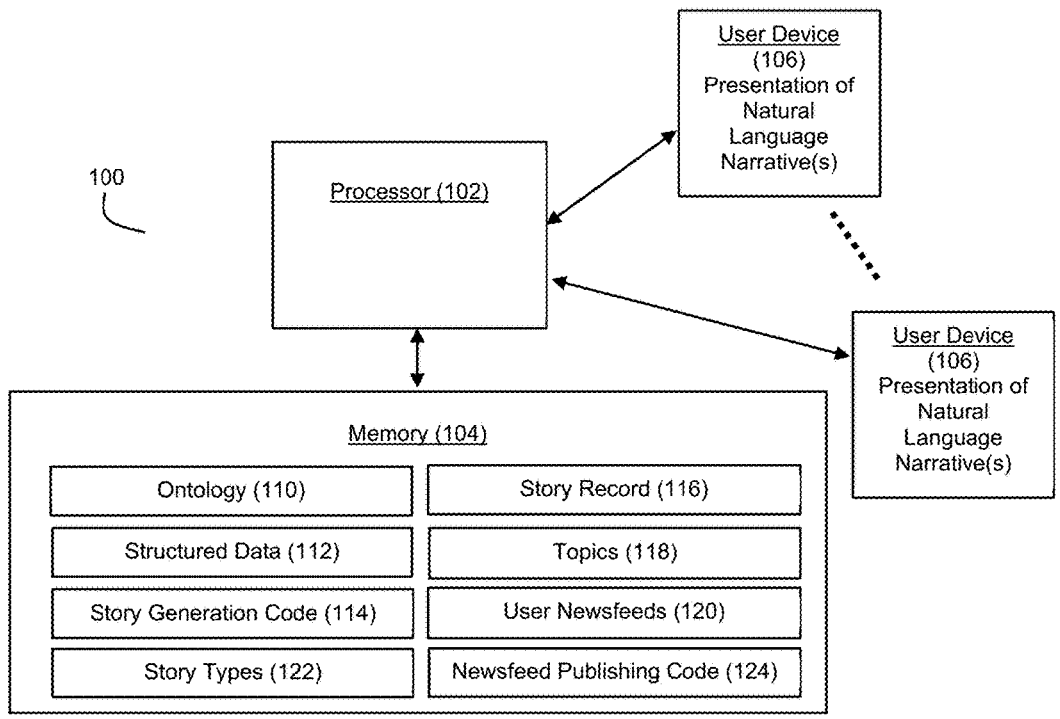
Figure 1
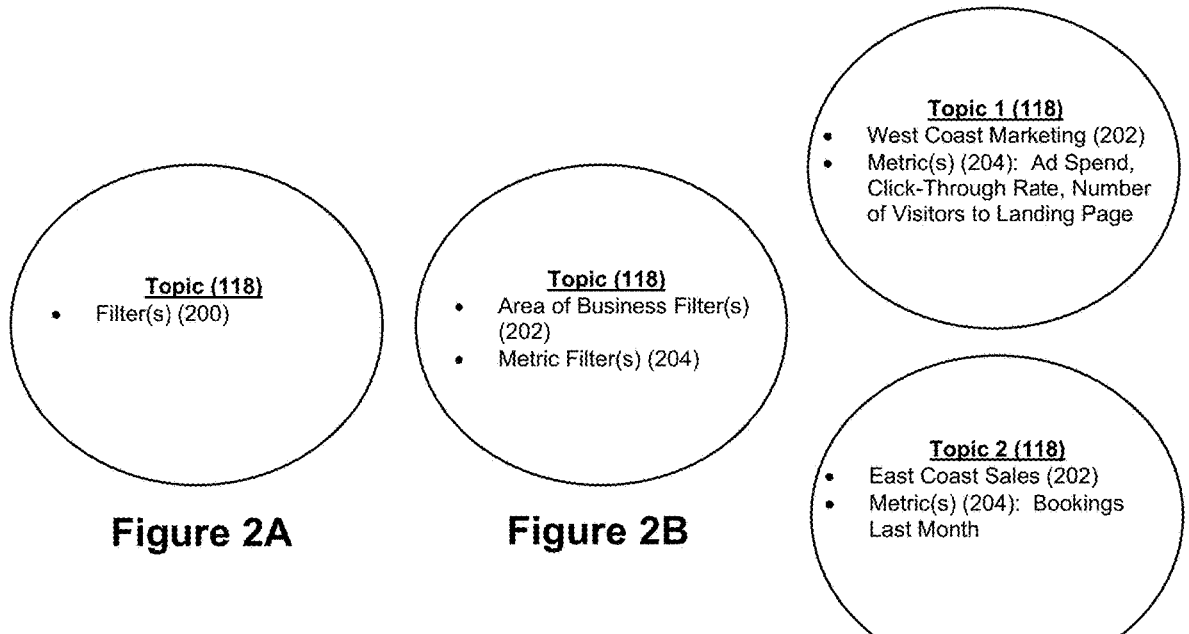
Figure 2A　　Figure 2B　　Figure 2C

Figure 7G

APPLIED ARTIFICIAL INTELLIGENCE TECHNOLOGY FOR INTEGRATING NATURAL LANGUAGE NARRATIVE GENERATION WITH NEWSFEEDS

CROSS-REFERENCE AND PRIORITY CLAIM TO RELATED PATENT APPLICATIONS

This patent application claims priority to U.S. provisional patent application Ser. No. 63/305,032, filed Jan. 31, 2022, and entitled "Applied Artificial Intelligence Technology for Integrating Natural Language Narrative Generation with Newsfeeds", the entire disclosure of which is incorporated herein by reference.

This patent application is related to U.S. patent application Ser. No. 18/161,334, filed this same day, and entitled "Applied Artificial Intelligence Technology for Updating Newsfeeds", the entire disclosure of which is incorporated herein by reference.

INTRODUCTION

There is an ever-growing need in the art for improved natural language generation (NLG) technology. NLG is a subfield of artificial intelligence (AI) concerned with technology that produces language as output on the basis of some input information or structure (e.g., where the input constitutes data about a situation to be analyzed and expressed in natural language).

For example, there is a need in the art for integration of newsfeed generation with NLG systems. There are significant technical shortcomings in the art with respect to newsfeed generation systems in how they make decisions about serving content to users. With conventional systems in the art, newsfeed generation typically performs natural language processing (NLP) and/or natural language understanding (NLU) operations on pre-written stories to determine the content these stories cover and which users would be interested in reading about such content. However, NLP/NLU technology can often be limited in how well it can infer what is being expressed in a sentence or story. For example, many stories will include ambiguous terminology (e.g., abbreviations whose context might be difficult to discern), ambiguous references to content expressed elsewhere or for which the reader is expected to implicitly know what is being referenced, and/or references to people with common or shared names.

As a technical improvement over conventional newsfeed generation systems in the art, the inventors disclose practical applications of computer technology where NLG systems that generate natural language narratives (stories) are integrated with newsfeed generation systems to better facilitate newsfeed generation for users. By coupling NLG with newsfeed generation in this fashion, decision-making about which stories should be served to which users can be based on analysis of representations of the stories that are linked to the ontologies, data models, and underlying source data from which those stories were generated. These representations can be the semantic source models from which the stories are generated. For example, the semantic source models may comprise parameterizable intents that are to be addressed by the stories (e.g., story types as discussed below), story configurations from which stories are generated, and/or story outlines from which stories are generated. This provides the newsfeed generation operations with much deeper insights into the semantic content, concepts, and references that are present in the stories, which lets the newsfeed generation operations make better decisions about which stories should be served to which users. In this regard, the system can make decisions about how stories are to be shared with users, where the sharing decisions are not based on NLP or NLU being applied to the text of finished stories.

For example, with this approach, the integrated NLG/newsfeed system can identify metrics that are shared between semantic source models for story generation and topics followed by the users to decide on how narrative stories generated from such semantic source models are to be shared with users (e.g., if User X follows Topic 1, and where Metric A is shared by both a subject semantic source model and Topic 1, the system can decide that the natural language narrative story generated from the subject semantic source model is to be shared with User X).

As another example, with this approach, the integrated NLG/newsfeed system can better identify and match people who are referenced in stories with users who subscribe to newsfeeds so that stories which mention a newsfeed user and/or mention teams or groups of which that newsfeed user is a member can be identified and published to that user's newsfeed. Because the integrated system will have access to the ontology and higher level semantic source model of the story, the system can make reliable conclusions as to matches that exist between people or teams/groups mentioned in stories and users who get served stories via newsfeeds.

As another example, the integrated NLG/newsfeed system can access users' calendar information to better identify stories that may be of interest to users. For example, by processing a higher level semantic source model of a story in coordination with the ontology and data model that underlies the story, the system can accurately identify the entities that are described in a story. A user's electronic calendar can then be processed to identify any upcoming meetings or appointments that are scheduled at entities or with people from entities that are described in the stories. When matches in this regard are found, the system can make a decision to serve the story that mentions the matching entity to the user who is deemed to have an upcoming meeting/appointment with that entity.

As yet another example, the integrated NLG/newsfeed system can leverage the higher level story semantic source models that represent the stories in terms of the concepts, ideas, metrics, and other filters that they address to make reliable determinations about situations where new stories render older stories out-of-date in some fashion. Upon recognizing the existence of out-of-date stories, the system can then take corrective action, such as making updates that will cause the newsfeeds to present fresher and more accurate information to the users.

These and other features and advantages of example embodiments of the invention are described in greater detail below.

BRIEF DESCRIPTION OF THE DRAWINGS

FIG. 1 shows a computer system for integrated narrative generation and newsfeed generation in accordance with an example embodiment.

FIGS. 2A-2E show examples of topics that can be used to support newsfeed generation.

FIGS. 7A-7I show examples of how the system can detect and take corrective action in the presence of out-of-date information in stories and newsfeeds.

DETAILED DESCRIPTION OF EXAMPLE EMBODIMENTS

Figure 2D:
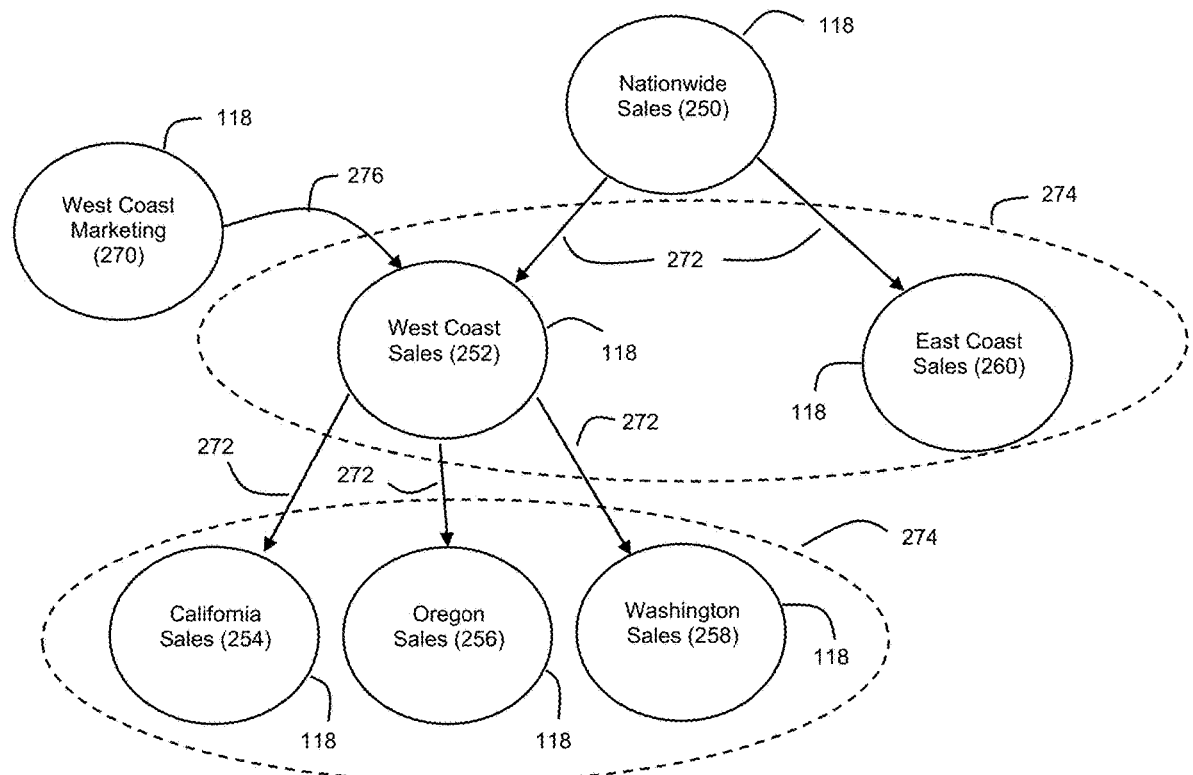

FIG. 1 shows an example computer system 100 in accordance with an example embodiment. The computer system 100 may comprise a processor 102 and memory 104 that cooperate with each other to perform natural language generation (NLG) on structured data to generate natural language narratives as described herein for delivery to users such as through a newsfeed or the like. The generated natural language narratives can be presented to users via one or more user devices 106. In this regard, computer system 100 can also be referred to as an NLG system 100.

The computer system 100 comprises one or more processors 102 and associated memories 104 that cooperate together to implement the operations discussed herein. The processor(s) 102 and memory(ies) 104 may be arranged as one or more servers. The one or more processors 102 may comprise general-purpose processors (e.g., a single-core or multi-core microprocessor), special-purpose processors (e.g., an application-specific integrated circuit or digital-signal processor), programmable-logic devices (e.g., a field programmable gate array), etc. or any combination thereof that are suitable for carrying out the operations described herein. The associated memories 104 may comprise one or more non-transitory computer-readable storage mediums, such as volatile storage mediums (e.g., random access memory, registers, and/or caches) and/or non-volatile storage mediums (e.g., read-only memory, a hard-disk drive, a solid-state drive, flash memory, and/or an optical-storage device). The memory 104 may also be integrated in whole or in part with other components of the system 100. Further, the memory may be local to the processor(s) 102, although it should be understood that the memory 104 (or portions of the memory) could be remote from the processor(s) 102, in which case the processor(s) 102 may access such remote memory 104 through a network interface. For example, the system 100 (including the processor(s) 102 and memory(ies) 104) can take the form of a distributed computing architecture if desired by a practitioner. For example, multiple processors can be employed, and different processors may carry out different portions of system operations. For example, a first processor may generate natural language narrative stories while a second processor determines how those natural language narrative stories are to be shared. Further still, a third processor may carry out the actual sharing (e.g., publications to newsfeeds). The memory 104 may store code (e.g., software programs or instructions) for execution by the processor(s) 102 during operation of the system 100. Such code can take the form of a plurality of instructions configured for execution by processor(s) 102. The memory 104 may also include one or more databases, file systems, and/or other suitable storage systems for storing source data, project data, and/or session data used by and/or generated by the system 100. It should also be understood that the computer system 100 may include additional or different components if desired by a practitioner.

The user devices 106 through which the narratives are presented to users can take any of a number of forms. For example, the user device(s) 106 can be a screen, monitor, or other visual display device through which the generated narratives are visually presented to one or more users via one or more graphical user interfaces (GUI(s)). As another example, the user device(s) can be a speaker that audibly presents the generated narratives to one or more users. The user device(s) 106 may be local to or remote from the processor 102. As a remote connection example, the GUI(s) displayed by a screen can be presented on a client machine that serves as the user device 106, where the client machine accesses the data generated by processor 102 via a network connection (e.g., over the Internet). The client machine could take the form of a desktop computer, smart phone, tablet computer, laptop computer, or other device capable of interacting with processor 102 to display natural language narratives as discussed herein. As another remote connection example, the user device 106 can be an Alexa or similar smart speaker device (which may or may not include a touchscreen GUI) that interacts with users via audible sound. Thus, in example embodiments, users can consume the natural language narratives produced by system 100 by reading and/or hearing them.

Returning to FIG. 1, the memory 104 can store structured data 112 that serves as the data set to be described by the natural language narratives produced by the system 100. The structured data 112 can take the form of data in a database, data in spreadsheet files, or other structured data accessible to the processor 102. For example, the structured data can comprise data organized into a plurality of fields such as values in various rows and columns of data tables. System 100 operates to analyze this structured data 112 using the techniques described herein to generate natural language narratives about the structured data 112 that express one or more insights about the structured data 112. For example, the natural language narratives can express one or more characterizations of the structured data 112 to provide users with meaningful insights about the structured data 112.

The memory 104 can also store an ontology 110 that serves as a knowledge base for the domain of the system. The ontology 110 can be a data structure that identifies the entities and types of entities that exist within the knowledge domain used by the system to generate narratives, and the ontology 110 can also identify additional characteristics relating to the entity types such as various attributes of the different entity types, relationships between entity types, and the like. Further still, the ontological objects (such as entity types, etc.) can be associated with expressions that can be leveraged by the system when the system realizes a narrative that addresses such ontological objects in natural language. Example embodiments of the ontology 110 that can be used with system 100 are described in U.S. Pat. Nos. 10,990,767, 10,963,649, 10,943,069, 10,762,304, 10,755,046, and 10,719,542, the entire disclosures of each of which are incorporated herein by reference. Thus, it should be understood that ontology 110 can provide contextual knowledge about the content of the structured data 112 by relating such data to entities, entity types, attributes, relationships, etc. as well as how such features can be expressed in natural language. Moreover, the entities and entity types encompassed by the ontology 110 can include the users who are members of an organization that shares access to the system or who are known within the knowledge domain. Through the organization of the ontology 110, the users can also be arranged in hierarchies and/or teams or groups that reflect the roles of the respective users in the subject organization.

Further still, the memory 104 can store story generation code 114 for execution by processor 102. Execution of the story generation code 114 by processor 102 operates to analyze the structured data 112 using techniques described herein to generate natural language narratives about the structured data 112.

The memory 104 can also store data that defines a plurality of story types 122 for the system 100. The story types 122 define the different types of natural language narratives that the system can generate, and these story types 122 can be characterized as intents. An intent represents an informational goal which can be satisfied by the system 100 via content expressed in a natural language narrative, and it can be represented within the system 100 by a set of requirements for the system 100 to create the information that would satisfy the informational goal. In an example embodiment, the intents and thus the story types 122 can be characterized as questions on particular topics that the NLG system 100 is capable of answering. These questions can be parameterizable. For example, an intent can be expressed as a parameterizable question such as "how was [metric] in [timeframe]?", where [metric] and [timeframe] are tokens that can be parameterized to a defined context. Moreover, each story type 122 can be associated with corresponding analytics that can be executed to evaluate a given intent with respect to a data set. These corresponding analytics can be executed with respect to the structured data 112 to generate one or more results or answers that are responsive to the informational goal sought to be achieved by a given story type 122. As such, these results/answers serve as items of content that can be expressed in a natural language narrative for the subject story type 122.

An example of a story type 122 that can be supported by system 100 is a "Track" story type corresponding to an informational goal of tracking a metric in a timeframe. Another example of a story type 122 that can be supported by system 100 is a "Breakdown" story type corresponding to an informational goal of breaking down an aggregated metric along one or more specified dimensions. Additional examples of informational goals which can serve as story types 122 and intents are described in (1) U.S. Pat. Nos. 9,576,009, 10,762,304, 10,943,069, and 11,068,661, the entire disclosures of each of which are incorporated herein by reference and (2) U.S. patent application Ser. No. 16/183,270 (filed Nov. 7, 2018 and entitled "Applied Artificial Intelligence Technology for Narrative Generation Based on Explanation Communication Goals"), 63/192,396 (filed May 24, 2021 and entitled "Artificial Intelligence Technology for Natural Language Generation Using a Graph Data Structure"), and Ser. No. 17/749,518 (filed May 20, 2022 and entitled "Artificial Intelligence Technology for Natural Language Generation Using a Graph Data Structure in Combination with Chooser Code, Structurer Code, and Realizer Code"), the entire disclosures of each of which are incorporated herein by reference.

Further still, the story types 122 can be organized as a plurality of nodes in graph data structures such as authoring graphs and knowledge graphs as described in the above-referenced and incorporated U.S. patent application Ser. Nos. 63/192,396 and 17/749,518. The story generation code 114 can then interact with these graph data structures as described in the above-referenced and incorporated '396 and '518 patent applications to generate natural language narratives corresponding to the various story types 122. For example, the story generation code 114 may comprise chooser code, structurer code, and realizer code that traverses the graph data structures to analyze the structured data 112 using analytics corresponding to various intents to generate content for expression in the natural language narratives.

The natural language narratives generated by the story generation code 114 can be stored in a story record 116, where the story record 116 serves as a repository for the stories generated by system 100. The system 100 can then deliver these stories to user devices 106 using the techniques described herein. In particular, the system 100 can support highly intelligent and customizable user newsfeeds 120 that are delivered to different users of the system 100.

To support these newsfeeds 120, the memory 104 can store data that represents a plurality of topics 118. Each topic 118 defines a specific topic of information that the system 100 is capable of producing that can be delivered to users via user newsfeeds 120. Thus, as the system 100 generates stories corresponding to various story types 122, these stories can be categorized into topics 118 that reflect the informational content of these stories, and this topical categorization can then drive how the system 100 distributes the stories to users via the user newsfeeds 120.

Accordingly, each user newsfeed 120 can be associated with a user of the system 100 and store references or pointers to stories in the story record 116 that the system 100 deems to be of interest to the associated user according to the techniques described herein. The topics 118 can serve as an organizing principle for the characterization of these stories to facilitate which stories will be deemed relevant to which users.

FIG. 2A shows an example topic 118. A topic 118 comprises one or more filters 200 that define the subject topic. For example, the filters 200 may comprise one or more area of business filter(s) 202 and one or more metrics filters 204 (see FIG. 2B). Through the combination of such filters 202 and 204, a specific topic 118 can be identified.

An area of business filter 202 can specify which parts of a business organization will be relevant for the topic 118. For example, Product Development, West Coast Marketing, Sales, Product Usage, Overseas Engineering may be suitable as areas of business for a particular business organization. The area of business filter(s) 202 of each topic 118 can be configured to specify such areas of business via constraints that are understandable to the system 100 via ontology 110. For example, with some business organizations, a set of geographic constraints may help specify an area of business, e.g., Filter=California OR Oregon OR Washington to specify a west coast area of business. Or for business organizations with user-defined segments such as a West Coast Segment=California OR Oregon OR Washington, the area of business filter 202 may simply be Filter=West Coast Segment.

A metric filter 204 can specify one or more metrics that are relevant to the topic 118. For example, Ad Spend, Clickthrough Rate, Number of Visitors to Landing Page may be relevant metrics for a marketing topic. FIG. 2C shows an example Topic 1 for West Coast Marketing that uses filters 202 and 204 to specify West Coast Marketing and these metrics to define the West Coast Marketing topic. As an additional example, Bookings Last Month may be relevant to a sales topic. For example, see FIG. 2C which shows an example Topic 2 for East Coast Sales that uses filters 202 and 204 to specify East Coast Sales and the Bookings Last Month metric to define the East Coast Sales topic As an additional example, a metric such as Bugs Fixed This Quarter may be relevant to an engineering or product development topic, etc. The metrics defined by metric filters 204 may comprise both measures and timeframes that are understandable to the system 100 via ontology 110.

It should be understood that many topics 118 within the system 100 may share a number of filters 200 in common. For example, a topic 118 that addresses West Coast Sales may share the same metric filters 204 with a topic 118 that addresses East Coast Sales. In such a circumstance, the difference between the two topics may be in their area of business filters 202. As another example, a topic 118 that addresses West Coast Sales may share the same area of business filters 202 with a topic 118 that addresses West Coast Marketing. In such a circumstance, the difference between the two topics may be in their metric filters 204.

Topics 118 can have relationships with each other. For example, as shown by FIG. 2D, some topics 118 can have a hierarchical relationship with each other (see links 272 between a topic such as Nationwide Sales 250 and topics such as West Coast Sales 252 and East Coast Sales 260; see also links 272 between a topic such as West Coast Sales 252 and topics such as California Sales 254, Oregon Sales 256, and Washington Sales 258). Further still, some topics 118 can have peer relationships with each other (see peers 274 as shown by FIG. 2D—such as (1) between West Coast Sales 252 and East Coast Sales and (2) between California Sales 254, Oregon Sales 256, and Washington Sales 258). Moreover, some topics 118 can have influencer relationships with each other (see influencer relationship 276 in FIG. 2D where the West Coast Marketing topic 270 can be deemed to influence the West Coast Sales topic 252).

These relationships among topics 118 can be configured explicitly by users or inferred by intelligence within system 100. As an example of automated inference, various topics 118 that address sales may share the same metric filters 204. A hierarchy can then be inferred among the topics 118 that share the same metrics by comparing their area of business filters 202. For example, with reference to FIG. 2D, it can be expected that the West Coast Sales topic 252 and the Oregon Sales topic 256 will have constraints for the area of business filter 202 in common (e.g., both would use State=Oregon as a filter constraint), but with the West Coast Sales topic 252 having a more inclusive area of business filter 202 (e.g., its filter 204 would be State=Oregon OR California OR Washington), which allows the system to infer a parent relationship 272 between the West Coast Sales topic 252 and the Oregon Sales topic 256. Further still, the Nationwide Sales topic 250 may have an even more inclusive area of business filter 202 (e.g., no state filter constraints, perhaps only a Country=USA filter) than the West Coast Sales topic 252 (or even no area of business filter 204 at all if the subject business organization does not have sales outside the USA), which allows the system to infer a parent relationship 272 between the Nationwide Sales topic 250 and the West Coast Sales topic 252.

As another example of automated relationship inference, it can be expected that the West Coast Sales topic 252 and the East Sales topic 260 will share the same metric filters 204 but will have a disjointed set of constraints for the area of business filters 202 (e.g., their area of business filters 204 may not have any states in common), which allows the system to infer a peer relationship 274 between the West Coast Sales topic 252 and East Coast Sales topic 260.

As yet another example of automated relationship inference, the system can detect that two topics 118 share the same or overlapping area of business filters 202 and can further determine from the ontology 110 or associated data modeling that one or more of the metrics defined by metric filters 204 have an influencing relationship with each other (e.g., a driver relationship can be identified in the ontology 110 or associated data modeling), which allows the system to infer an influencer relationship 276 between the topics (e.g., the metrics specified by the filter 204 for the West Coast Marketing topic 270 can be drivers of the metrics specified by the filter 204 for the West Coast sales topic 252).

The relationships among topics 118 can be used by the system to influence how the stories are shared with users. For example, in a scenario where Topic 1 is a parent of Topic 2, and where User X is a follower of Topic 1, the system may make a decision to publish a story associated with Topic 2 to User X's newsfeed because Topic 2 can be considered to be a subtopic of Topic 1 (which User X has expressed an interest in knowing about). This may be useful in scenarios where User X has a supervisory role in an organization where it may be desirable for User X to stay abreast of all information that may be subsumed within Topic 1 (including child topics of Topic 1). As another example, consider a scenario where Topic 3 has an influencer relationship with Topic 4 where a metric addressed by Topic 3 is expected to drive a metric addressed by Topic 4. In this circumstance, if User Y is a follower of Topic 4, the system may make a decision to publish a story associated with Topic 3 to User Y's newsfeed because it may be beneficial for User Y to be aware of circumstances that are expected to be influencing the topic (Topic 4) that he or she is following.

Further still, the ontology 110 can define relationships among ontological objects such as entities, entity types, attributes, etc. These relationships can also be hierarchical relationships, peer relationships, and/or influencer (driver) relationships. The system can use the relationships among ontological objects in the ontology 110 to influence how the stories are shared with users. For example, a semantic source model for a story may identify that the story will address the concept of bookings in Massachusetts. The topics 118 may include a topic with an area of business filter 202 that defines the "Northeast" region of the United States. The ontology 110 defines a relationship between a "Northeast USA" entity and a "Massachusetts" entity so that the system knows that Massachusetts is a member of the Northeast USA entity. On this basis, the system can decide that stories generated from the semantic source model which references Massachusetts should be posted to the topic 118 for the Northeast region of the USA.

In an example embodiment, the topics 118 can be created in response to user input. For example, a user interface (UI) can be provided that allows a user to specify constraints for filters 200 to define topics 118 (e.g., by specifying constraints for area of business filters 202 and/or metric filters 204). Further still, user input can also specify relationships among topics 118. For example, the UI for topic creation can include a "Make Subtopic" button or the like for a current topic that allows the user to add a new, more restrictive filter 200 for a new topic 118 that is to serve as a child of the current topic 118. Further still, the UI for topic creation can include a "Generalize Topic" button or the like for a current topic that allows the user to remove a filter 200 for a new topic 118 that is to serve as a parent of the current topic 118. Moreover, the UI can include another button that allows the user to adjust filters 200 for the current topic to easily create peer topics 118.

Figure 2E:
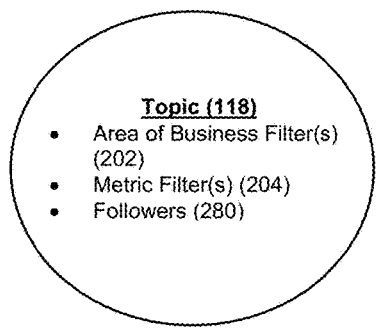

Further still, users of the system can register to become followers of one or more topics 118 supported by the system. As part of this, the system 100 may recommend topics 118 to users for the users to follow based on defined criteria where the system 100 determines there is an intersection of interests between a user and a topic 118. Further still, in an example embodiment, the system may allow users to become followers of specific metrics within a topic 118 rather than the entire topic 118 itself. Accordingly, each topic 118 and/or metrics within a topic 118 may also comprise a defined set of users who serve as followers 280 (see FIG. 2E).

Figure 2F:
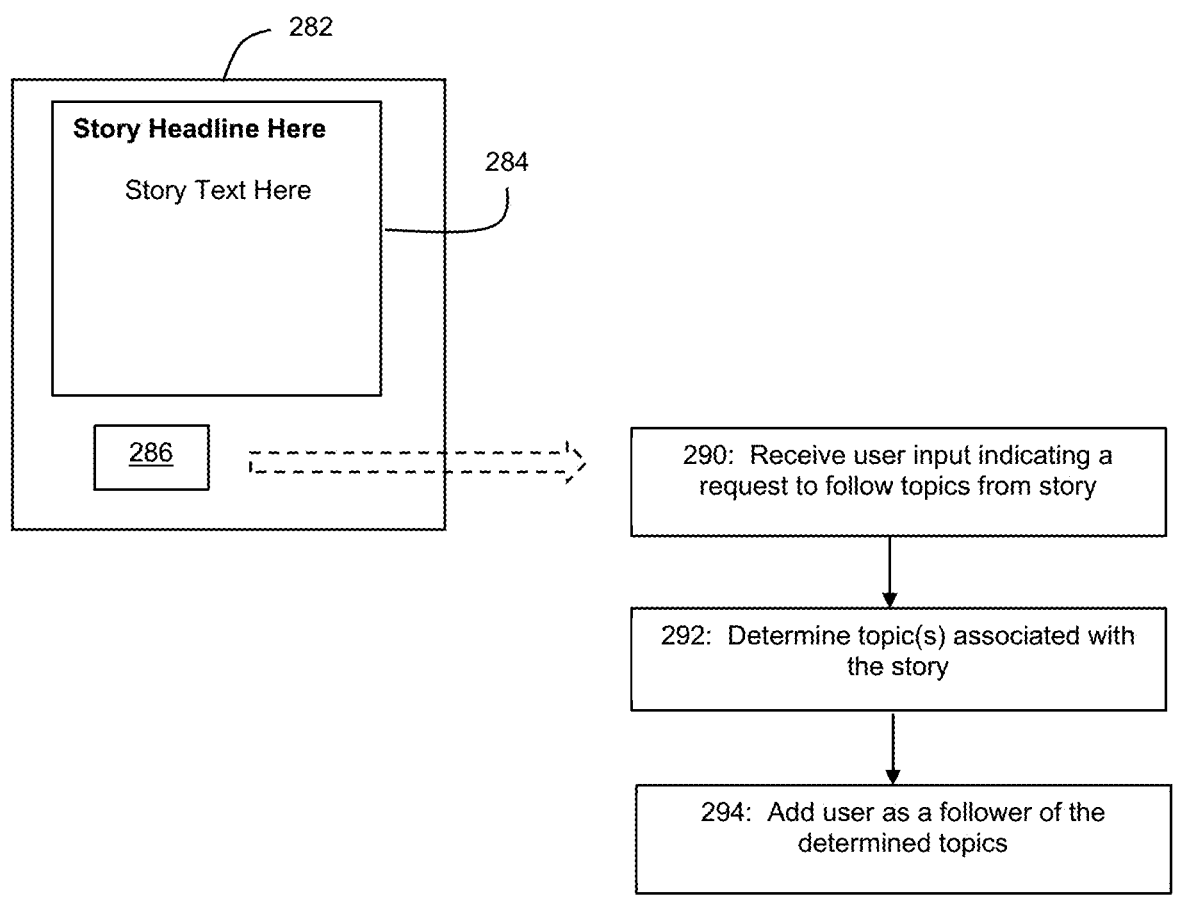
FIG. 2F shows an example where users are able to become followers of topics based on interactions with presented stories.
Figure 3A:
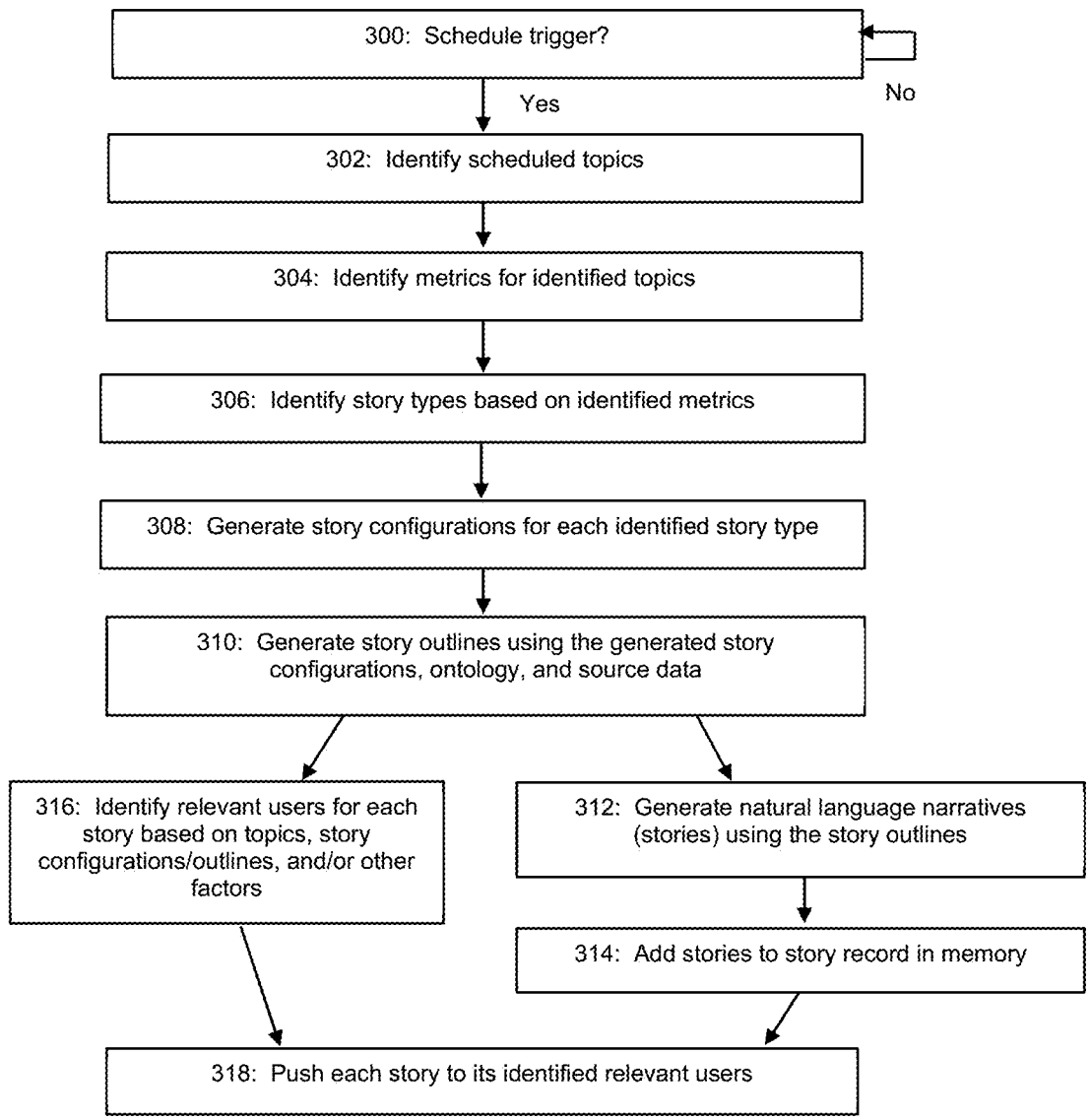
FIG. 3A shows an example process flow for generating and publishing recurring stories to newsfeeds.
Figure 3B:
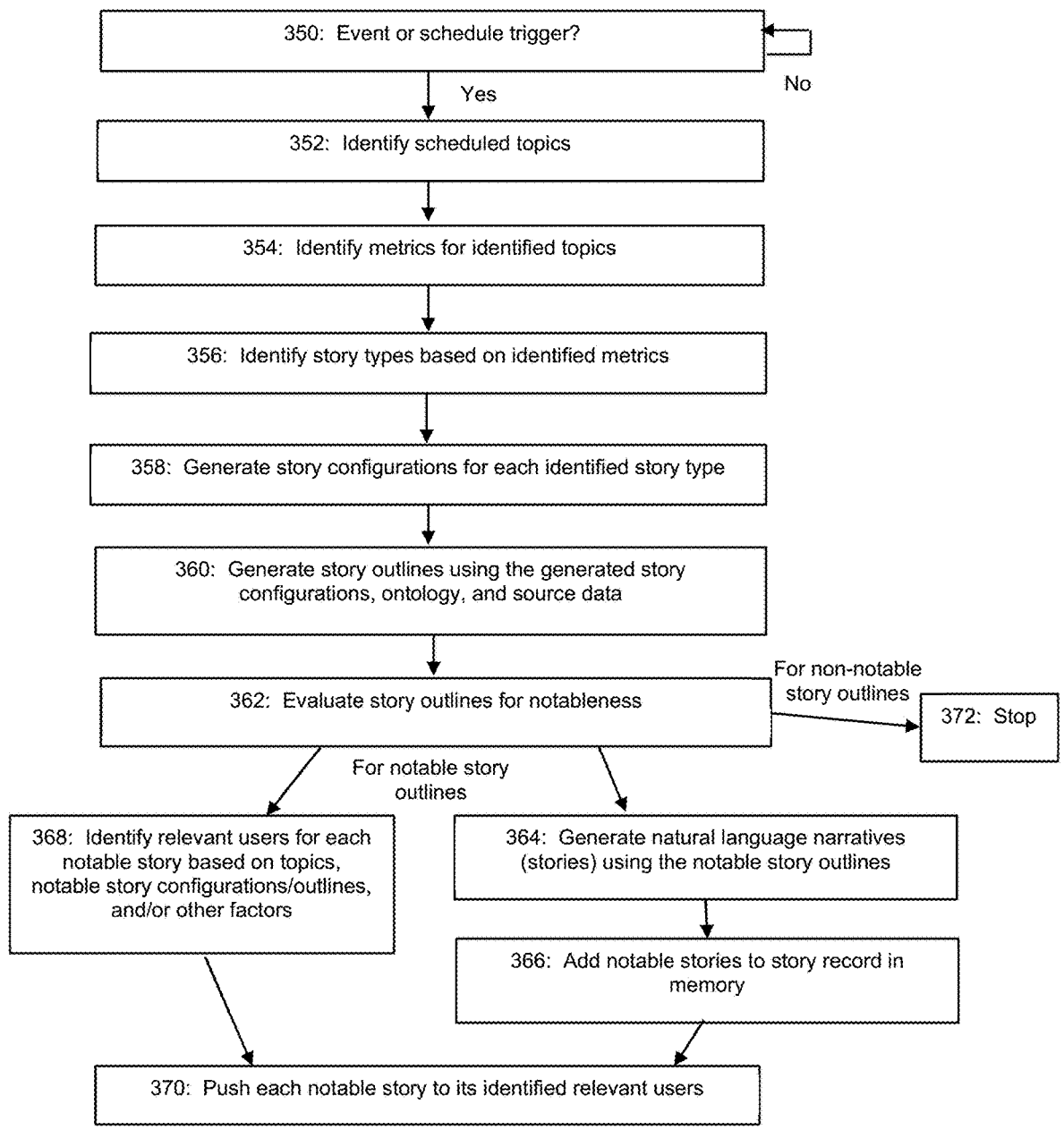
FIG. 3B shows an example process flow for generating and publishing notable insight stories to newsfeeds.

Further still, the stories generated by the system 100 can be presented on a UI along with a user input feature such as a button or link that the user would select to register as a follower of the topic(s) addressed by the presented stories. An example of this is shown by FIG. 2F, which depicts a UI 282 that presents a story 284 to a user. If a user reads story 284 and finds this story interesting, the user can select a "Follow Relevant Topics" button or link 286 or the like that will operate to add the user as a follower to the topic(s) addressed by the story. User selection of button/link 286 (see step 290) can cause the system to determine the topics 118 that are associated with the story 284 (step 292). The topic(s) that are associated with a given story can be known by the system as discussed below with respect to example process flows as shown by FIGS. 3A and 3B. Also, the semantic source model for the story 284 can be processed to determine the topics 118 addressed by the story 284 via shared metrics or other components. At step 294, the user is added as a follower of the topic(s) determined at step 292. As such, the newsfeed for the subject user can thereafter be updated to include stories that address the topics for which the user is now a follower. Furthermore, in situations where the story 284 is associated with multiple topics 118, the process flow of FIG. 2F may include logic if desired by a practitioner that allows the user to select which of the determined topics that the user wants to follow.

Once one or more topics 118 have been created and the system 100 generates stories via code 114, the system 100 can also begin associating stories with their relevant topics 118 and publishing the topic-associated stories to relevant users for the topics 118 via user newsfeeds 120. Thus, users can explicitly follow topics 118 which capture areas of interest for the users. The system 100 can generate and regularly update a personalized newsfeed 120 for each user, where a given user's newsfeed 120 contains all of the stories that are associated with a topic 118 that the subject user follows as well as stories that the system 100 infers would be of interest to the user based on defined criteria (examples of which are discussed below). In an example embodiment, two types of stories that can get published to newsfeeds 120 include recurring stories and notable insight stories.

Recurring stories can be stories that the system 100 will generate on a scheduled basis to provide a "heartbeat" of regular updates on the metrics specified by different topics 118. For example, at the end of the day, the system can generate and publish West Coast Sales stories such as a "$42k in bookings for the West Coast for Feb. 10, 2022" story and a "$150k in new pipeline for the West Coast for Feb. 10, 2022" story; while at the end of the next day, the system can generate and publish new West Coast Sales stories on these topics such as "$39k in bookings for the West Coast on Feb. 11, 2022" and "$142k in new pipeline for the West Coast on Feb. 11, 2022", and so on.

Notable insight stories can be stories that the system 100 will generate when a notable event is detected within the structured data 112. To support this, the system 100 can regularly compute updated metric values for the topics 118 and perform an analysis on these metric values to determine whether they indicate something that is "notable". Notableness can be evaluated on any of a number of criteria as discussed below with respect to example embodiments. For example, notableness can be derived based on measurements of the importance and/or interestingness of the metric values or stories that describe these metric values. Examples of techniques for determining the importance and/or interestingness of data values in the context of analytics for NLG systems are described in U.S. Pat. Nos. 8,630,844, 8,688, 434, 8,775,161, 9,576,009, and 11,232,268, the entire disclosures of which are incorporated herein by reference. When a given story will describe metric values that are deemed notable, this story can then be published by the system as a notable insight story.

Examples of story types 122 that can be used for these recurrent and notable insight stories can be "Track" stories and/or "Breakdown" stories as discussed above.

Figure 5:
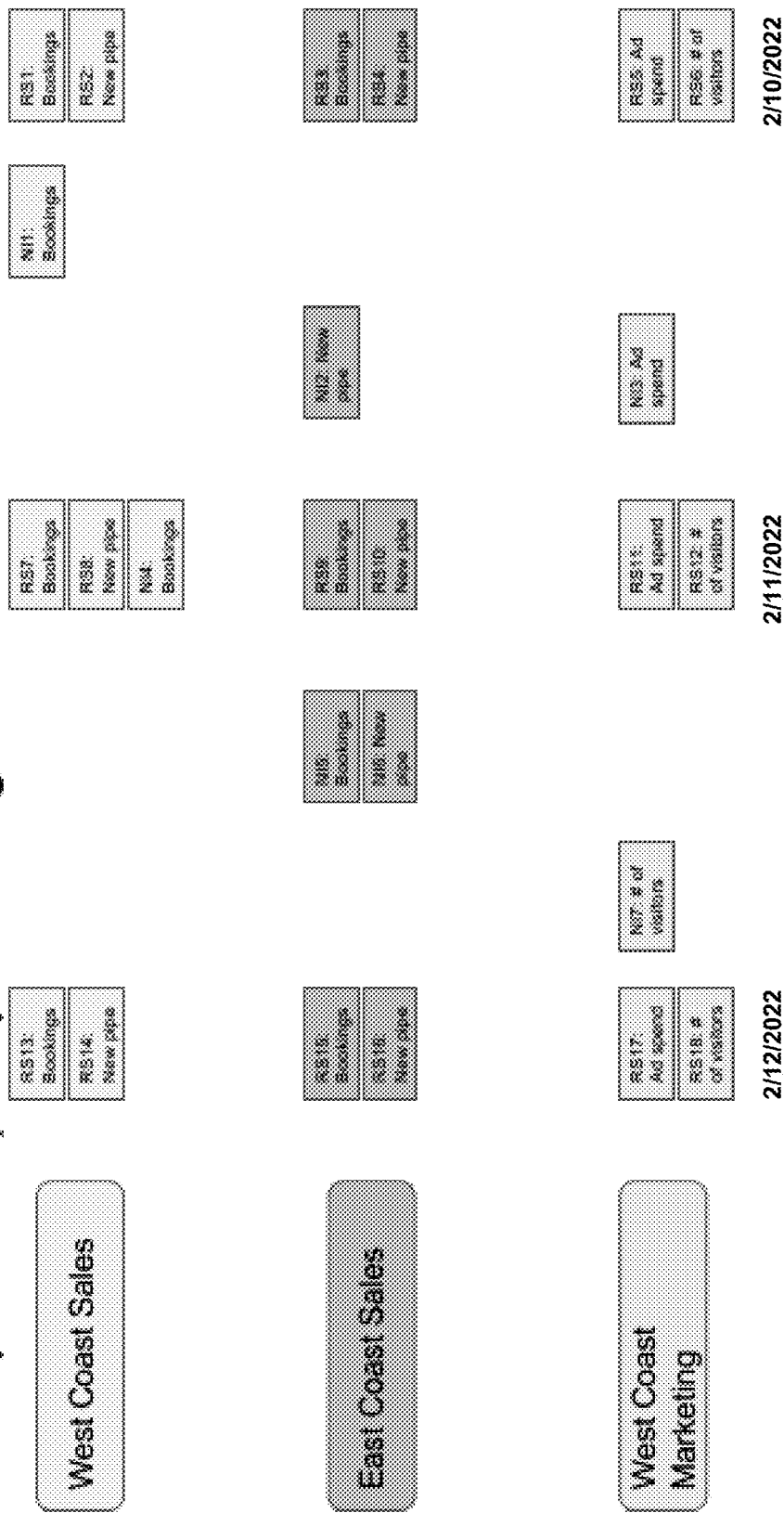
FIG. 5 shows an example timeline of story generation for various topics.

FIG. 5 depicts an example timeline of how different topics 118 can produce recurring stories and notable insight stories. In this example, there are three topics 118: West Coast Sales, East Coast Sales, and West Coast Marketing. Each day, the system 100 can generate a recurring story (RS) for the "Bookings" and "New Pipe" metrics for both the West Coast Sales and East Coast Sales topics. With this arrangement, it should be understood that RS1 describes bookings that are relevant to the West Coast Sales topic on Feb. 10, 2022 while RS3 describes bookings that re relevant to the East Coast Sales topic on Feb. 10, 2022. The system 100 can generate notable insight (NI) stories for each topic only when warranted by the underlying data (e.g., see NI1 on Feb. 10, 2022 for West Coast Sales; NI3 for West Coast Marketing on Feb. 10, 2022, etc.).

FIG. 3A depicts an example process flow for execution by newsfeed publishing code 124 to create and update the user newsfeeds 120 with respect to recurring stories.

At step 300, the processor 102 determines whether it is time to trigger story generation. This trigger can be tripped on a scheduled basis (e.g., once per day, every 4 hours, once per week, etc.).

Once triggered, the processor 102 identifies which topics 118 are scheduled for story generation (step 302). For example, different topics 118 may be configured for different schedule updates, although this need not be the case. The processor 102 can identify all of the metrics defined by the metric filters 204 of the identified topics (step 304), and then determine which story types 122 use such metrics (step 306). In this fashion, step 306 can operate to map topics 118 to their associated story types 122 via metrics that are shared between the topics 118 and story types 122. For example, a Track story type and a Breakdown story type may utilize the metrics identified at step 306, so the system can determine from step 306 that a Track story and a Breakdown story should be generated for the metrics identified by each of the scheduled topics.

For steps 308, 310, and 312, the processor 102 can execute story generation code 114 to generate a natural language recurring story based on the identified story types and the identified metrics for each scheduled topic 118. Examples of story generation code 114 that can be used for this purpose are described in U.S. Pat. Nos. 8,688,434, 8,775,161, 9,576,009, 9,697,197, 10,572,606, 10,699,079, 10,943,069, 11,003,689, and 11,068,661, the entire disclosures of each of which are incorporated herein by reference, and in the above-referenced and incorporated '396 and '518 patent applications.

At step 308, the processor 102 generates story configurations for each story type identified by step 306. Each story configuration will have an associated topic 118 and story type 122, and it can be parameterized by combining the results from the filters 200 of the associated topic 118 and any other metrics specified for the associated story type 122. An example story configuration can be "How many deals did we close in the West Coast yesterday".

At step 310, the processor 102 generates a story outline for each story configuration using the ontology 110 and source data 112 to compute metric values that are to be expressed in the subject recurring story. As an example, this story outline can take the form of a story graph as described in the above-referenced and incorporated '396 and '518 patent applications. For example, the story graph may comprise one or more results that address one or more intents, where these results are to be expressed in the natural language narrative story that is to be generated from the story graph, and where the results are linked to the ontology 110 and arise from execution of analytics that are associated with the one or more intents using structured data 112. As such, the story outline can be a machine-readable representation of the subject recurrent story that identifies content items to be expressed in the recurrent story (e.g., a particular salesperson to be expressed in the story, a particular entity for which an attribute value is to be expressed in the story, etc.) in a manner where the content items are linked to their corresponding objects from ontology 110.

At step 312, the processor generates the natural language narratives which are to serve as the recurring stories using the story outline. As an example, this NLG operation can be performed by realizer code as described by the above-referenced and incorporated '396 and '518 patent applications. The stories generated at step 312 can then be added to the story record 116 in memory 104 (step 314).

Meanwhile, at step 316, the processor 102 can also identify the relevant users for each story produced at step 312. These relevant users can include the users who are followers of the topic 118 associated with the subject story.

Moreover, it should be understood that a given story can be associated with multiple topics 118. For example, the semantic source model (such as the story outline generated at step 310) for a recurring story that is to be generated for Topic X may identify a concept to be addressed by the story that is different than the concept addressed by Topic X. As an example, the semantic source model for a story about bookings in Region 1 may identify that an idea is to be expressed that compares bookings in Region 1 with bookings in Region 2. Step 316 can operate to recognize that there is another topic 118 (Topic Y) that relates to bookings in Region 2 and decide that the story generated from the semantic source model should also be posted to Topic Y in addition to Topic X.

Figure 6A:
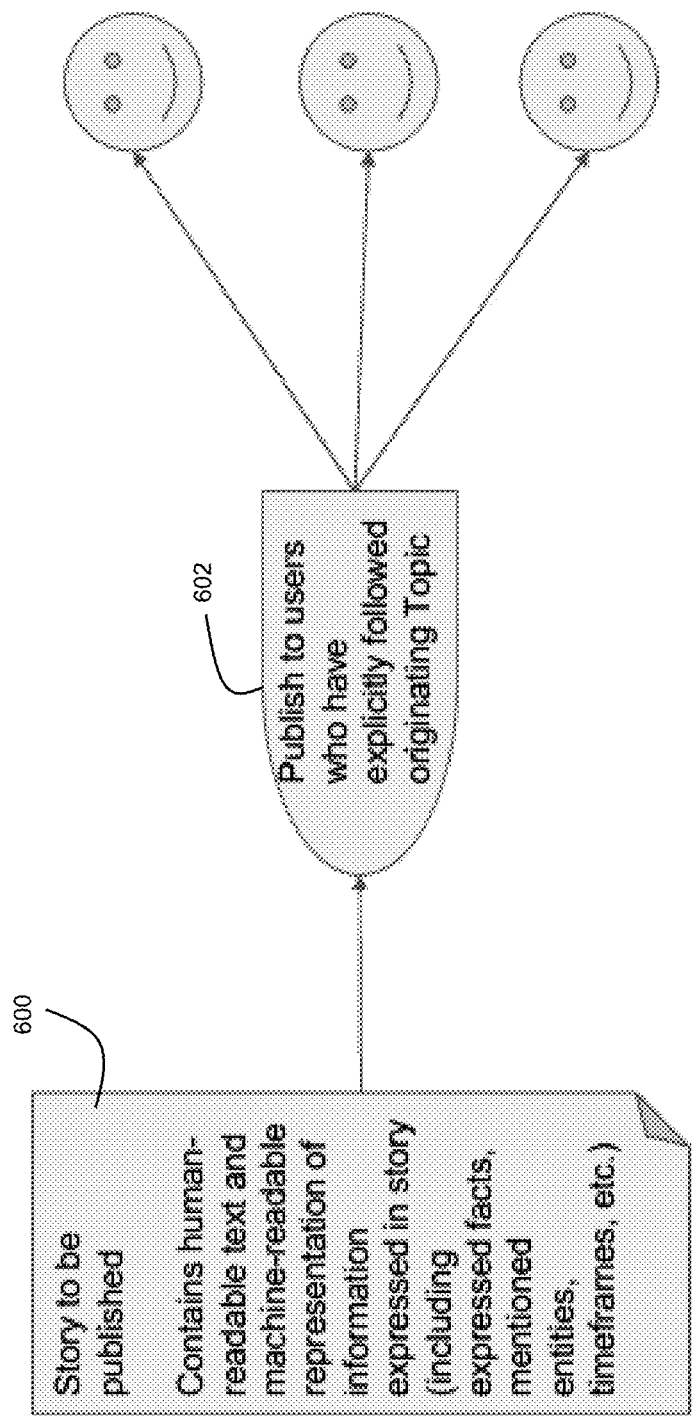
FIGS. 6A and 6B show examples where stories are published to user newsfeeds based on the topics followed by the users.
Figure 6B:

FIG. 6A shows an example process flow where a story 600 corresponding to a particular topic 118 is published at 602 to users who have explicitly followed that topic 118. FIG. 6B shows an example of user newsfeeds for a first user who is head of US sales and has followed the West Coast Sales and East Coast Sales topics (see left half of FIG. 6B) and a second user who is a West Coast GM and has followed the West Coast Marketing and West Coast Sales topics (see right half of FIG. 6B). The stories from the example of FIG. 5 populate these user newsfeeds 120 based on which topics the two users have followed.

Figure 6C:
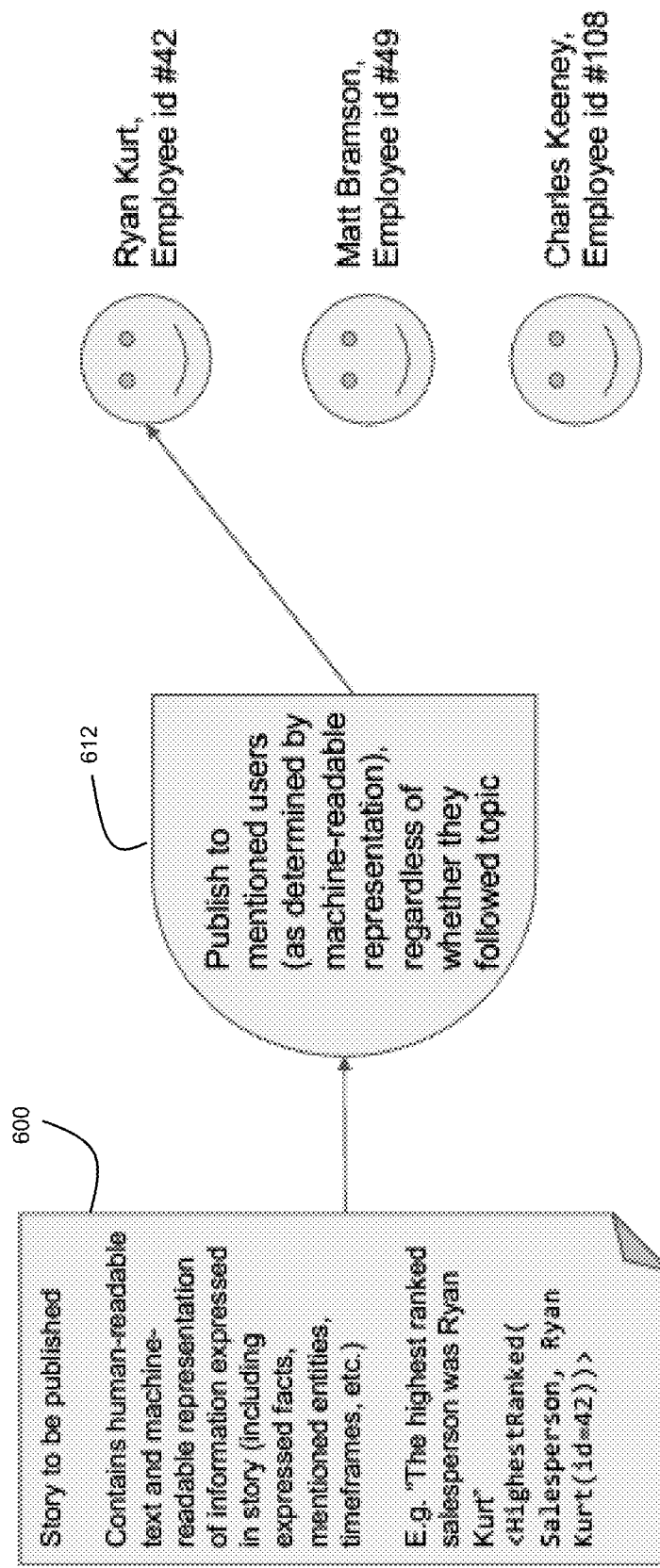
FIGS. 6C, 6D, and 6E show examples where stories are published to user newsfeeds based on mentions of users in stories.

However, at step 316, the system 100 can also support the identification of relevant users beyond just those who have already registered themselves as followers of the subject topic 118. For example, with reference to FIG. 6C, the processor 102 can analyze the story outline 600 to determine if there are any users who are mentioned in the story. Such users can be matched to users of the system 100 (such as via users who are known to the ontology 110), and these users can be identified as relevant for the story even if they are not followers of the subject topic 118 (see 612 in FIG. 6C). Similarly, if the story outline mentions a particular team or group within the relevant business organization, this team or group can be matched to teams or groups that are known via ontology 110, and the users who are members of this team or group can be identified as relevant for the story even if they are not followers of the subject topic 118. Of note, this ability to identify users and/or teams/groups who are mentioned in stories can leverage the rawer version of the story that includes linkages to ontological objects to improve the accuracy of the matching process. The system 100 need not perform NLP or NLU on the text of a finished story to identify such users. With this conventional NLP/NLU approach, background context such as linkages to the ontology 110 will be lost, and the ability to reliably disambiguate common names can be compromised (e.g., which "John Smith" is mentioned in the story—the one in the California office or the one in the Washington office?). With step 316, more reliable identifications of relevant users can be made than is possible with conventional newsfeed generation that relies on NLP/NLU processing of finished stories.

Figure 6D:
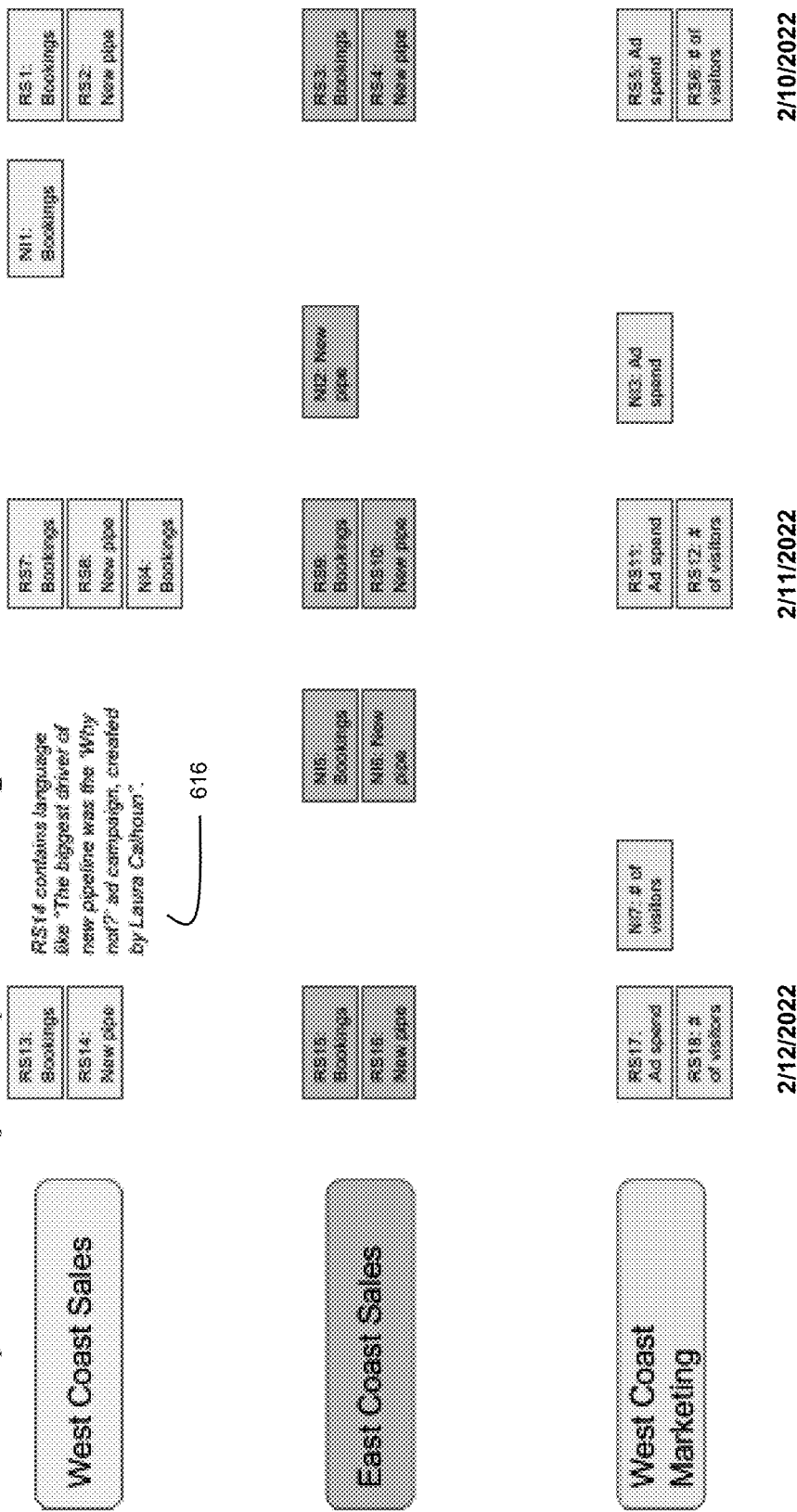
Figure 6E:
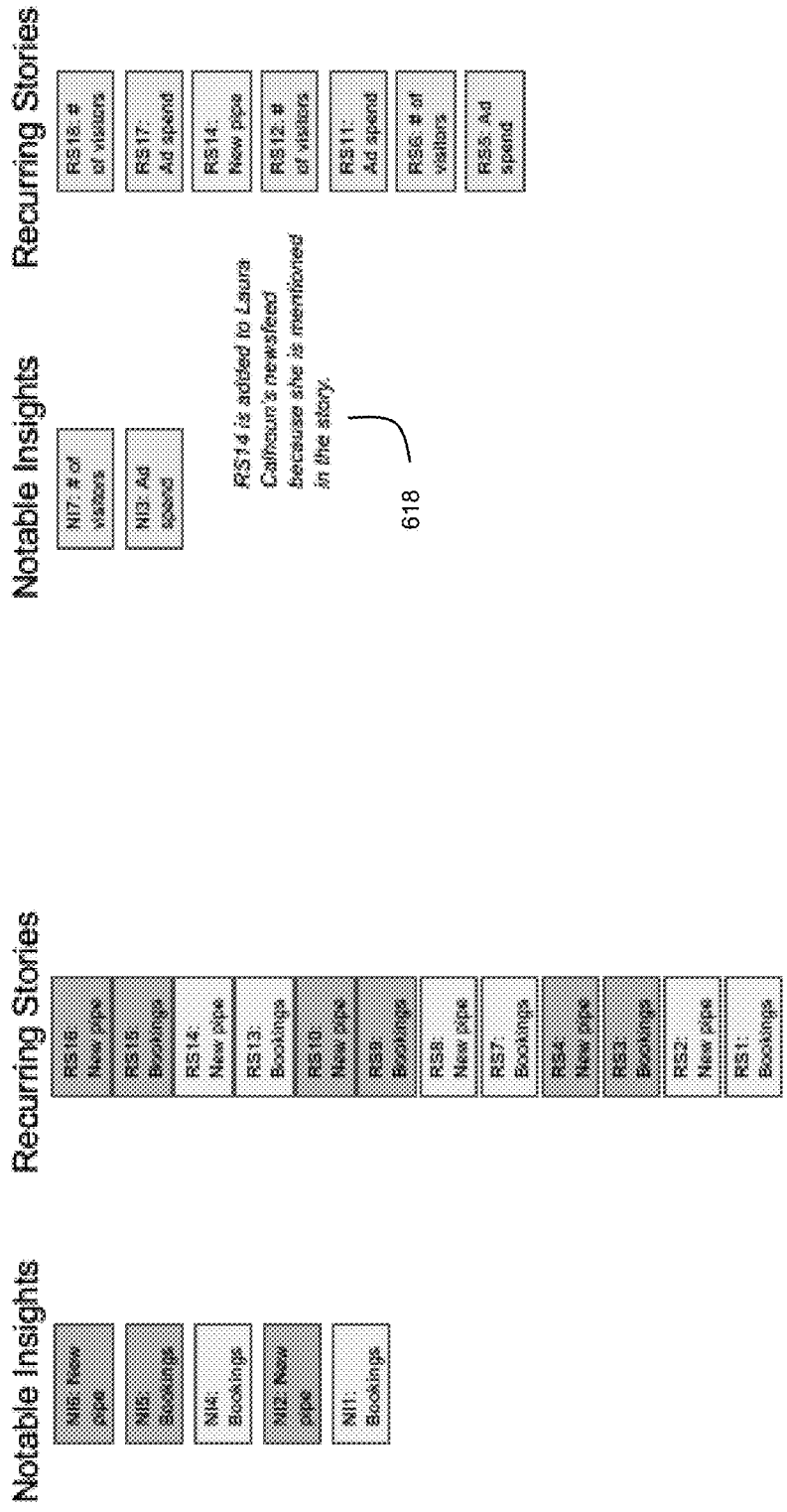

FIG. 6D shows an example timeline of story generations for various topics, where the stories include recurring story RS14 generated for the West Coast Sales topic. RS14 includes a statement that mentions the name Laura Calhoun in the context of an ad campaign (see 616). FIG. 6E then shows user newsfeeds for a first user who is head of US sales and has followed the West Coast Sales and East Coast Sales topics (see left half of FIG. 6E) and a second user who is Laura Calhoun who follows the West Coast Marketing topic (see right half of FIG. 6E). RS14 (which originated from the West Coast Sales topic) gets published in the newsfeed of the first user because the first user follows the West Coast Sales topic. However, RS14 also gets published in Laura Calhoun's newsfeed (even though she does not follow the West Coast Sales topic) because the system 100 is able to recognize that the Laura Calhoun mentioned in RS14 is the same Laura Calhoun for the newsfeed shown by FIG. 6E (see 618).

Figure 6F:
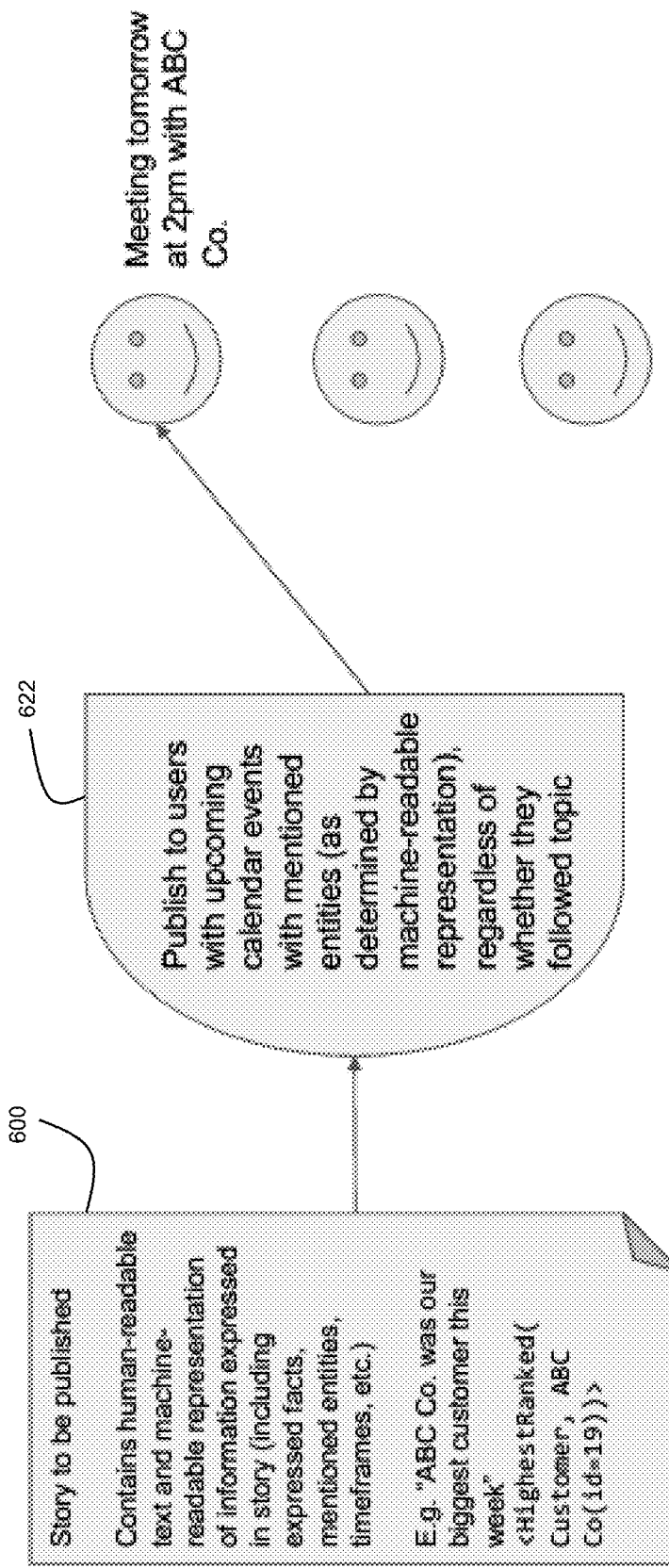
FIGS. 6F, 6G, and 6H show examples where stories are published to user newsfeeds based on assessments of the relevance of stories to users' calendar information.

Further still, the system 100 can use additional factors at step 316 to decide which users are relevant to a given story. For example, the system 100 can access the electronic calendars for its users via an application programming interface (API) or the like to identify upcoming meetings or appointments for those users (e.g., the meetings or appointments that will occur over a defined time period such as the next week or month, etc.). NLP and NLU operations and/or other operations such as matching operations can be performed on extracted calendar data to determine information that characterizes these meetings. For example, if User A has an upcoming meeting with another person who is recognized as a user within the ontology 110 (User B) or a member of a team within the ontology 110 (Team 1), the system 100 can also publish stories to User A that mention User B and/or Team 1. Similarly, if the calendar data indicates that User A has an upcoming meeting with someone from Company X, the system can also publish stories to User A that mention Company X. To the extent that the calendar data does not clearly identify who the upcoming meetings are with, inferences can be drawn from the information that is present in the calendar data. For example, if the calendar data includes the email address of the person with whom User A is meeting, the domain name level of the email address may identify a domain name that is known to be for Company X, which allows the system 100 to make an inference that User A's upcoming meeting is with Company X. Thus, as shown by FIG. 6F, a story or story outline 600 can be parsed to identify the entities mentioned in the story, and these entities can be compared with the entities derived from users' calendars to find potential matches (see 622). If a given story mentions ABC Co. and a given user has an upcoming meeting with ABC Co., this story can be published to that user.

Figure 6G:
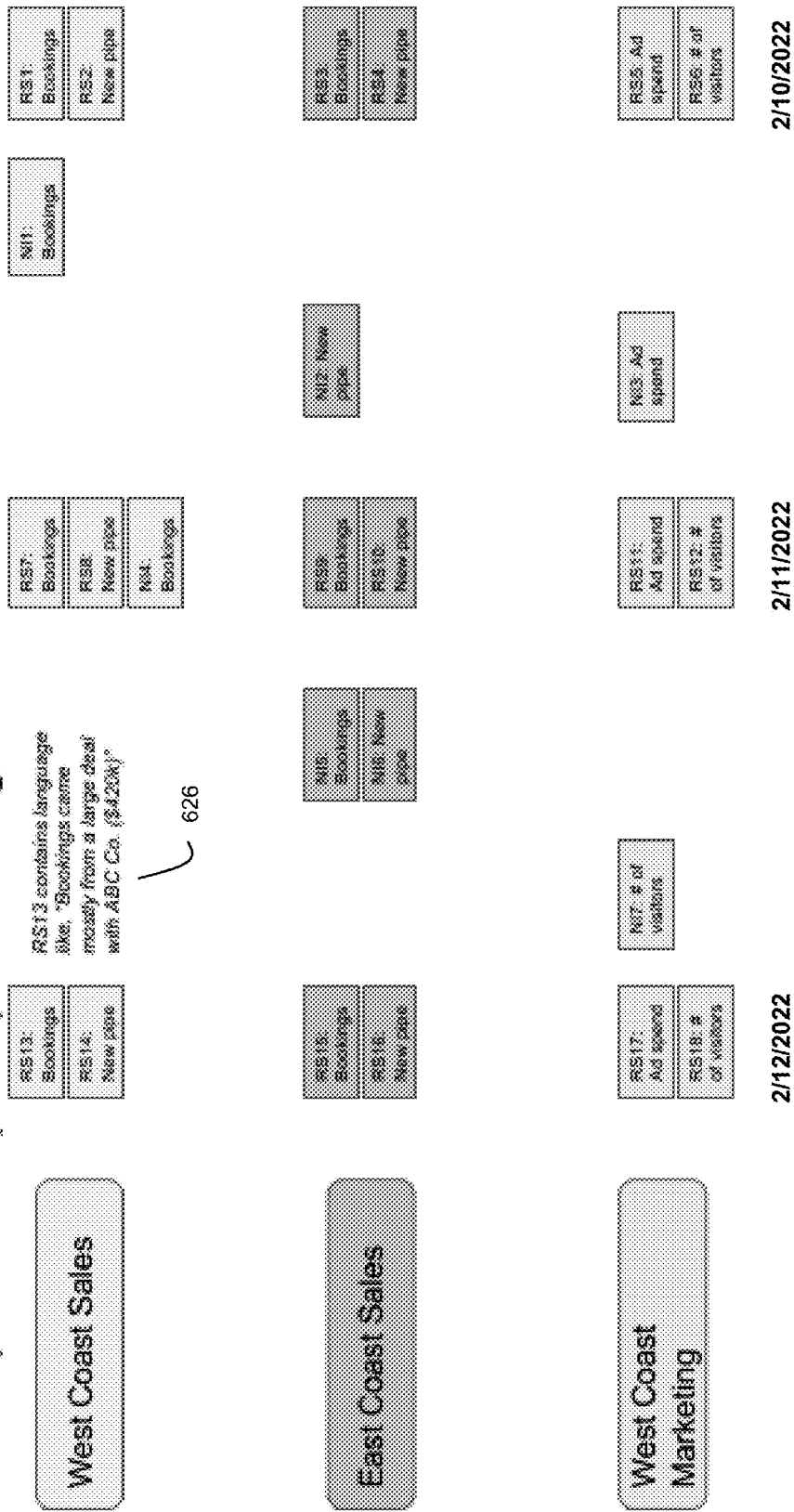
Figure 6H:

FIG. 6G shows an example timeline of story generations for various topics, where the stories include recurring story RS13 generated for the West Coast Sales topic. RS13 includes a statement that mentions the bookings from ABC Co. (see 626). FIG. 6H then shows user newsfeeds for a first user who is head of US sales and has followed the West Coast Sales and East Coast Sales topics (see left half of FIG. 6H) and a second user who is an East Coast salesperson and has followed the East Coast Sales topic (see right half of FIG. 6H). RS13 (which originated from the West Coast Sales topic) gets published in the newsfeed of the first user because the first user follows the West Coast Sales topic. However, RS13 also gets published in the East Coast salesperson's newsfeed (even though this salesperson does not follow the West Coast Sales topic) because the system 100 is able to recognize that this East Coast salesperson has an upcoming meeting with ABC Co.

Returning to FIG. 3A, at step 318, each recurring story generated at step 312 can then be published to the newsfeeds 120 of its identified relevant users from step 316.

FIG. 3B depicts an example process flow for execution by newsfeed publishing code 124 to create and update the user newsfeeds 120 with respect to notable insight stories. This process flow is triggered at step 350 on an event-driven and/or schedule-driven basis. For example, the processor 102 can regularly check whether any notable insights would be expressed by a story with respect to a topic 118 (e.g., checking once per hour, twice per day, etc.). The processor 102 may also be event-driven in this manner—e.g., where the FIG. 3B process flow is triggered whenever new data is added to the structured data 112.

Steps 352, 354, 356, 358, 360, 364, 366, 368, and 370 in FIG. 3B can be performed in a like manner as steps 302, 304, 306, 308, 310, 312, 314, 316, and 318 from FIG. 3A (albeit where the published stories for FIG. 3B will be notable insight stories, which means that steps 364, 366, 368, and 370 can be made contingent on a given story qualifying as notable). The relevant difference as between FIGS. 3A and 3B will be that FIG. 3B includes step 362 where a given story outline is evaluated for notableness. If a story outline is not deemed notable, then the process flow can proceed to step 372, in which case the story is not published. If a story outline is deemed notable, then the process flow can proceed through steps 364, 366, 368, and 370, where the notable insights story is generated and published to relevant users. However, it should be understood that in some example embodiments, the notableness testing from step 362 can be performed at the story configuration level (see step 358) or the story level (see step 366).

Any of a number of different techniques can be implemented at step 362 to test a story, story configuration, and/or story outline for notableness, examples of which are shown by FIGS. 4A-4D.

Figure 4A:
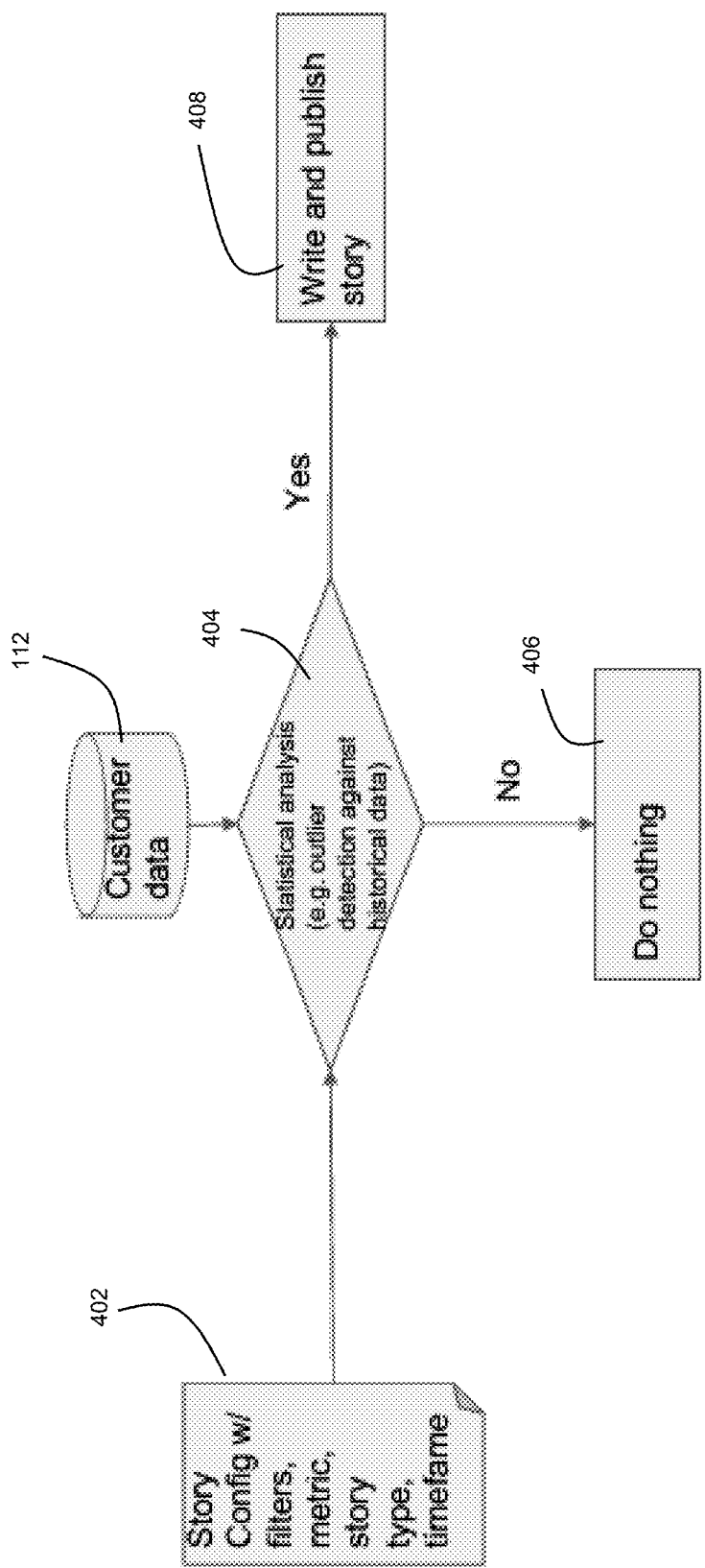
FIGS. 4A-4D show example techniques for evaluating the notableness of new story candidates.

FIG. 4A shows an example where a given story configuration 402 with corresponding filters, metrics, story type, and timeframe is parameterized and evaluated using the structured data 112 that is relevant to the filters, metrics, story type, and timeframe to compute the data values that would be part of the story outline. These data values can then be subjected to statistical analysis at 404 to assess whether the data values are notable. For example, this statistical analysis 404 can perform outlier detection for the data values as compared to historical levels for these data values. If the data values qualify as an outlier, then the story can be deemed notable, in which case it can be written and published as a notable insight story (step 408). Otherwise, the system will choose not to write and publish a notable story (step 410).

Figure 4B:
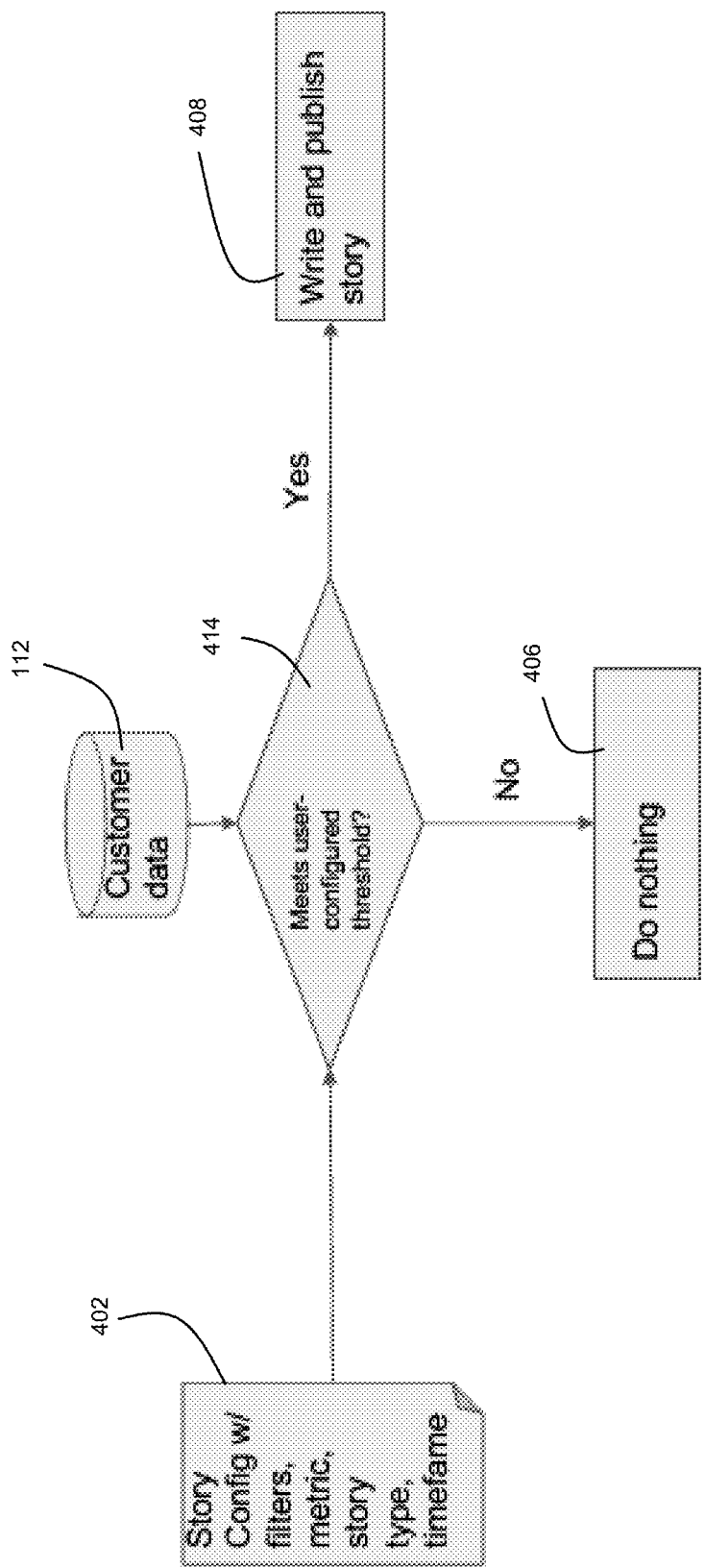

FIG. 4B shows an example where a given story configuration 402 with corresponding filters, metrics, story type, and timeframe is parameterized and evaluated using the structured data 112 that is relevant to the filters, metrics, story type, and timeframe to compute the data values that would be part of the story outline. These data values can then be compared with user-defined thresholds at 414 to assess whether the data values are notable. For example, the threshold may test for data values that change by (say) 25% relative to their previous value. If the data values exceed the threshold, then the story can be deemed notable (e.g., a sales value increasing or decreasing by 25% or more can be deemed notable), in which case a story can be written and published as a notable insight story (step 408). Otherwise, the system will choose not to write and publish a notable story (step 410).

Figure 4C:
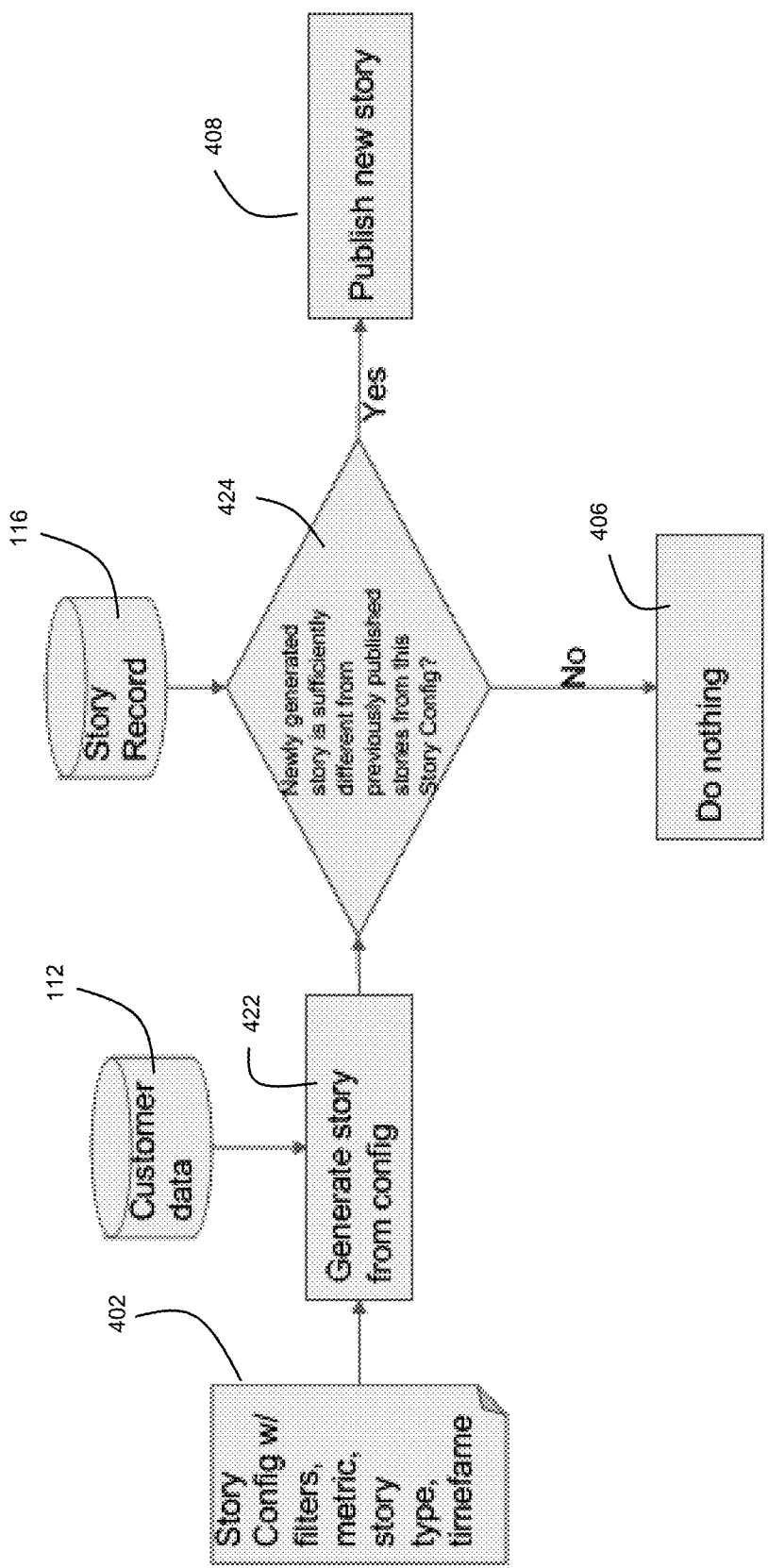

FIG. 4C shows an example where a story is generated (step 422) from a given story configuration 402 using the structured data 112 that is relevant to the story configuration. The processor 102 can then access the story record 116 to retrieve the most recent story that was published for those configurations. The story generated at step 422 can then be compared with the retrieved story (step 424) to determine if the new story is sufficiently different from the retrieved story to be deemed notable. If step 424 results in a determination based on defined criteria that that the new story is sufficiently different from the old story, then the new story can be deemed notable (in which case it is published at step 408).

Figure 4D:
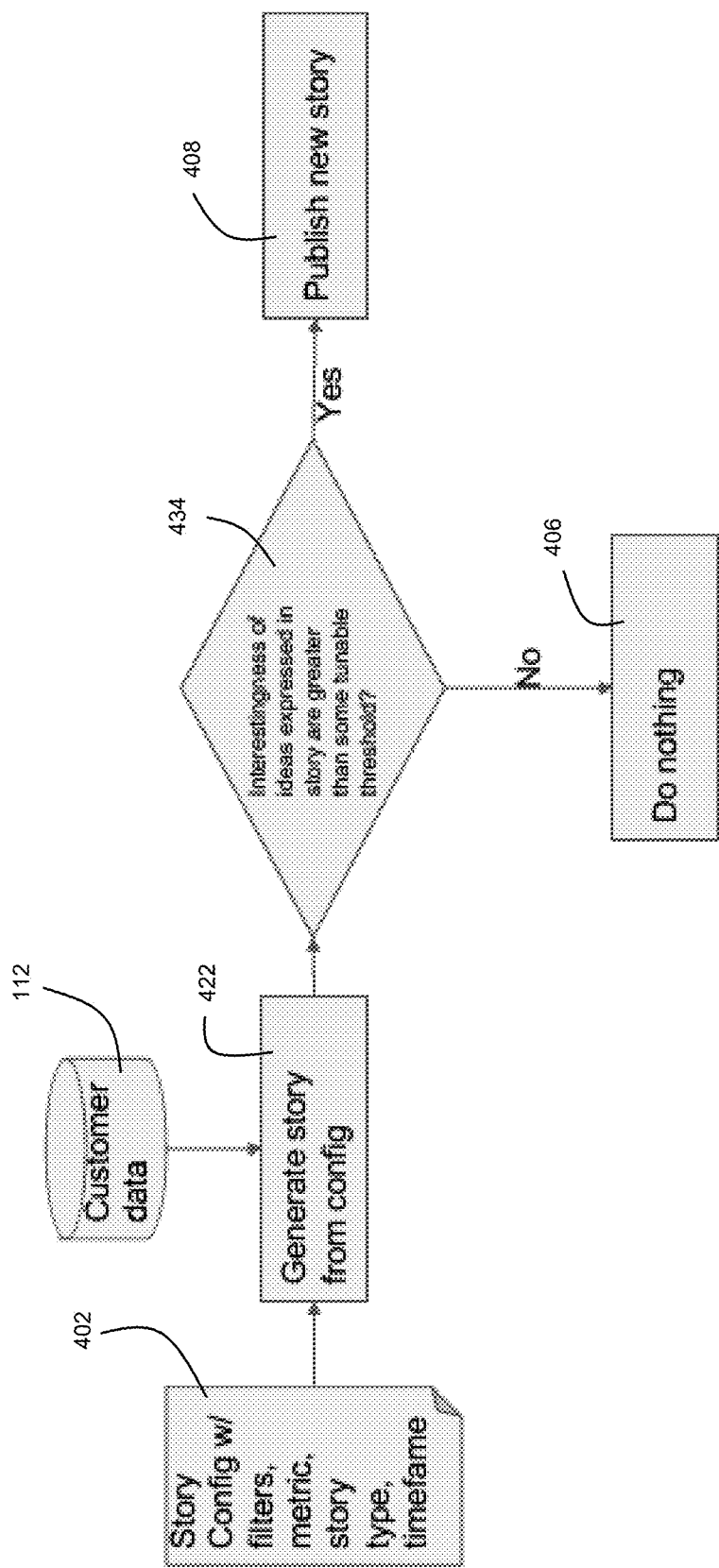

FIG. 4D shows another example where a story is generated (step 422) from a given story configuration 402 using the structured data 112 that is relevant to the story configuration. As described in the above-referenced and incorporated patents, the story generation process can compute an importance value and/or interestingness value for each story that is generated. The processor 102 can then compare these importance and/or interestingness values with a tunable threshold to determine whether the story qualifies as notable (step 434). If step 434 results in a determination that that the new story is important and/or interesting, then the new story can be deemed notable (in which case it is published at step 408).

Furthermore, it should be understood that any of FIGS. 4A-4D can be combined with each other to make decisions about notable insight stories based on a plurality of different factors.

The newsfeed publication code 124 can also include intelligence that is capable of removing out-of-date information from newsfeeds 120 and/or flagging such out-of-date information in the newsfeeds 120. For an example embodiment, when a story is determined by the code 124 to have information that is out-of-date, the system 100 can delete or overwrite the story that includes out-of-date information. For other example embodiments, when a story is determined by the code 124 to have information that is out-of-date, the system 100 can flag the story as out-of-date and add a pointer or link to a new story on the same topic that includes current information.

With example embodiments, the main mechanism for detecting the presence of out-of-date information in stories is to perform semantic diffing on the story configuration or story outline representations of the new story and existing stories to see if the same ideas expressed by the stories have changed. This semantic diffing can avoid a scenario where the system thinks a story is out-of-date because of small, inconsequential differences between the stories (e.g., changes in a synonym used to express an entity or the like).

In general, stories about the past will not change. For example, a "2021 bookings" story is unlikely to change; but this will not always be the case. For example, if there are changes/fixes to the underlying structured data 112 that are made after the "2021 bookings" story was generated and published, this story may now contain outdated information. For example, a "2021 bookings" story may be generated and published on Jan. 1, 2022; but there may have been a deal closed in 2021 that was not marked as such in the structured data 112 until late January 2022. In this case, the "2021 bookings" story published in early January 2022 may be outdated.

The system 100 may also generate a lot of stories that describe "this" $timeframe (e.g., bookings this week, bookings this month, new pipeline this week, etc.). These stories may change regularly as new data comes in.

When assessing stories for their freshness, the code 124 can determine both how much the specific items of information presented in the story have changed as well as how much the overall conclusions or characterizations presented in the story have changed. For example, there is not much of a significant change between the old story and the new story if it has gone from "This is a great week; you've closed 100 deals" to "This is a great week; you've closed 102 deals". By contrast, there is a significant change between the old story and the new story if it has gone from "This is a terrible week; you've closed 8 deals" to "This is a great week; you've closed 100 deals". To facilitate discrimination between minor story changes and major story changes, the code 124 can determine a size or magnitude of the difference between the stories, and then make decisions about how to handle the changes in story based on the determined size/magnitude of change. For example, for small changes, the code 124 may quietly amend the previous stories so that new presentations of those stories will include the updated information; but for large changes, the code 124 may remove the old story versions, attach editor notes to the old story versions, and/or push alerts to relevant users about the updated story content. To determine the size of change in story, the code 124 can determine any or all of the following (and use this information to make a multi-factored decision about the size of change):

Determine the number of ideas in the old/new story that have changed
  Determine the percent and/or absolute change in expressed values by the old and new stories
  Determine weights for the ideas expressed in the old and new stories based on importance values and/or interestingness values assigned to those ideas (where the importance/interestingness can be determined via techniques described in the above-referenced and incorporated U.S. patents). This weighting can accommodate a framework where changes in important/interesting information would contribute to a larger size of change than changes to unimportant/uninteresting information.
  Determine whether there are changes in the "headline" information of the story.
  Determine whether there are changes in the output of angles/characterizations for the stories (where the above-referenced and incorporated U.S. patents describe how angles and characterizations can be tested and determined for expression in different types of stories). In making these determinations, the code can consider the magnitude of change in characterization as well. For example, changing from a "bad" characterization to a "good" characterization (or vice versa) would indicate a larger size of change than changing from a characterization of "you are on track to meet your goal" to "you are definitely on track to meet your goal".

In an example embodiment, the tasks of evaluating stories for outdated information can be performed on a regular basis by code 124 (e.g., at scheduled intervals). In other example embodiments, the evaluation of stories for outdated information can be performed on a just-in-time basis—for example, where the generation of each new story causes the pool of existing stories to be tested to determine if the new story renders those existing stories outdated; or where the system checks a story for outdated information each time a user attempts to access that story.

Figure 7A:
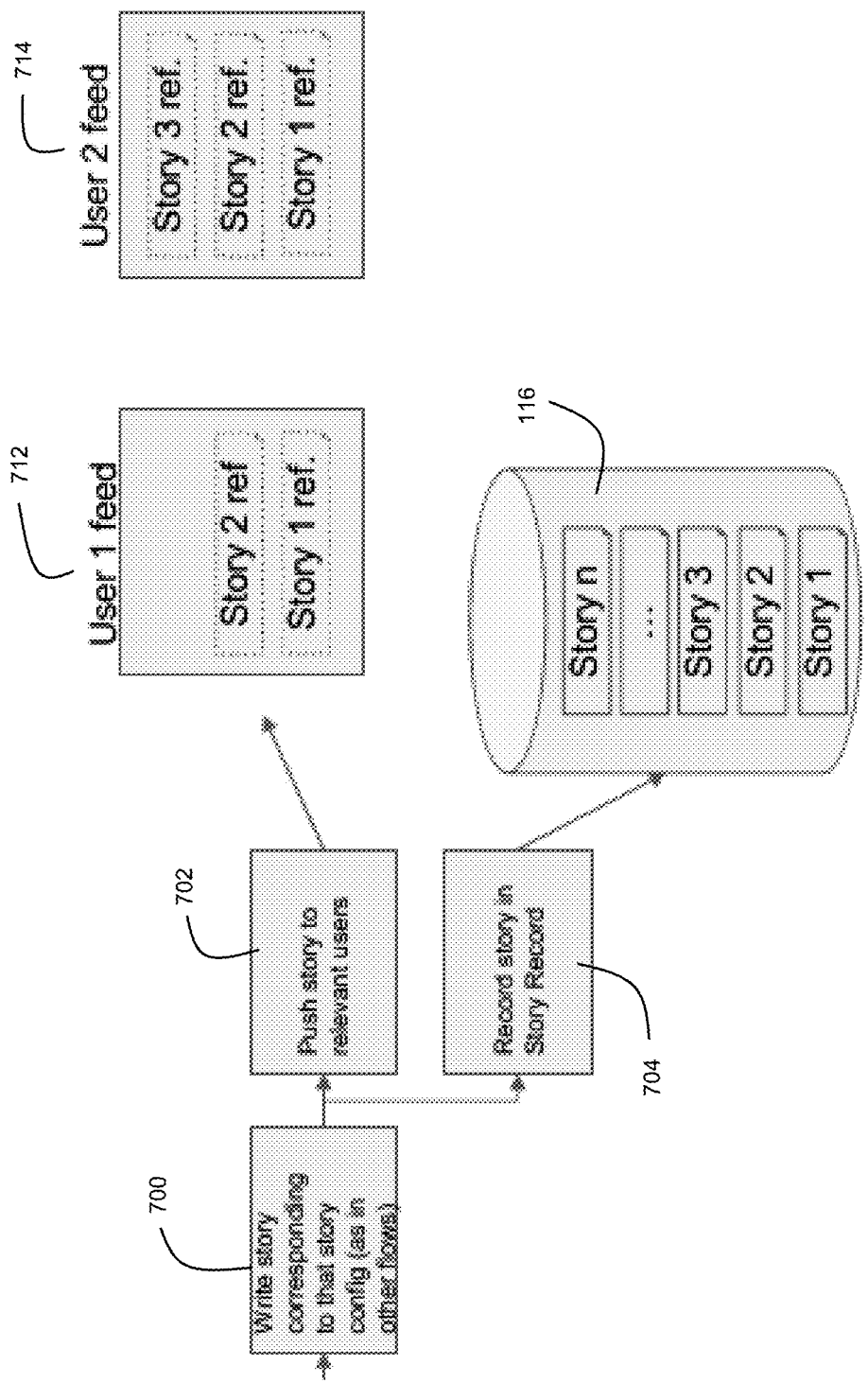

FIG. 7A shows how the code 124 can manage the story record 116 in concert with the publishing of stories to newsfeeds 120. At step 700, the code 124 writes a new story based on a resolved story configuration using techniques as discussed above (where such story may be a recurring story or a notable insight story). This story then gets published to user newsfeeds 712 and 714 (see step 702) using the techniques discussed above; and it also gets added to the story record 116. In an example embodiment, it should be understood that copies of the stories can be maintained in the story record 116, while the newsfeeds 120 (such as newsfeed 712 for User 1 and newsfeed 714 for User 2) hold pointers, references, or links to the stories in the story record 116.

Figure 7B:
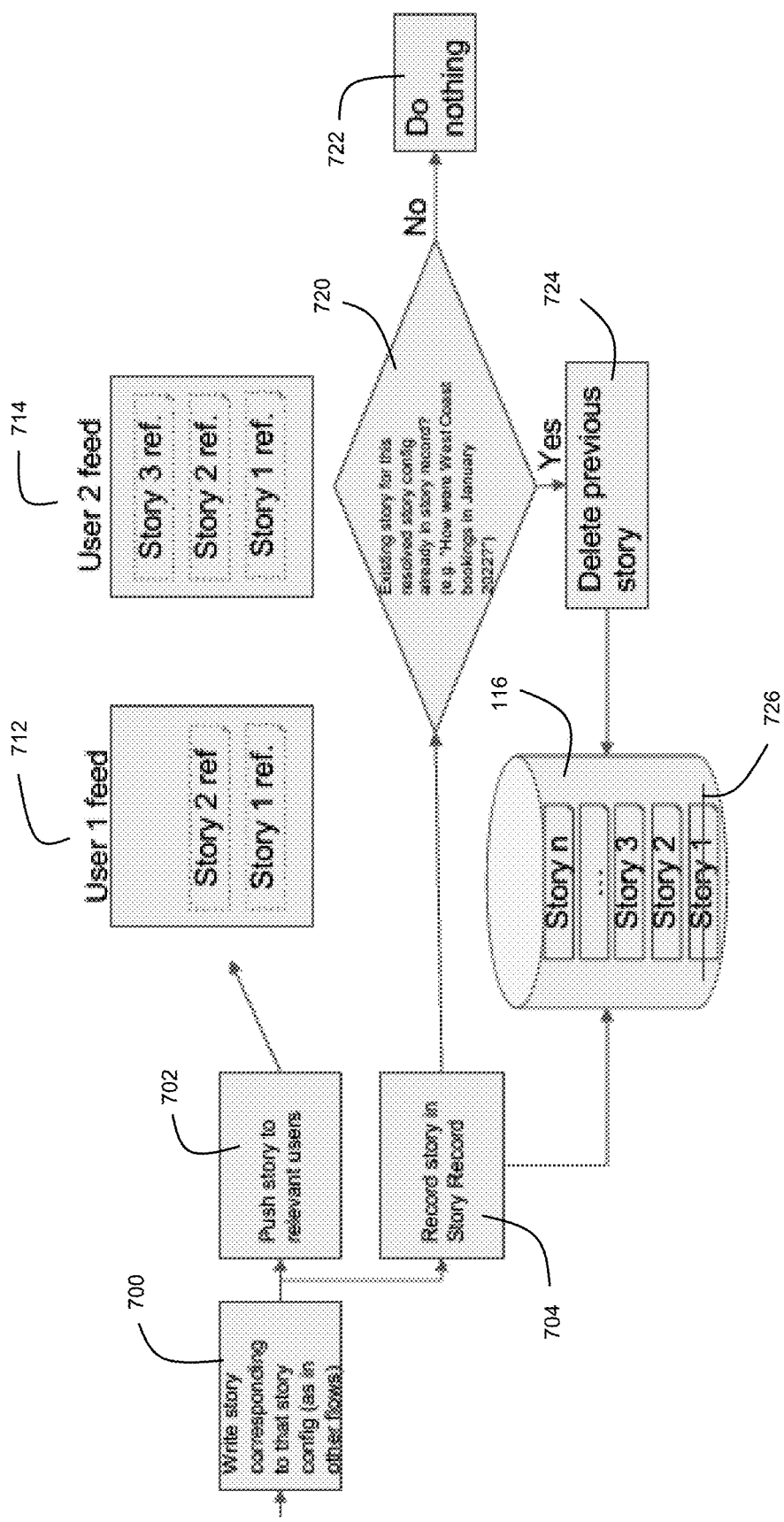

FIG. 7B shows a first example for detecting and handling out-of-date stories. In this example, the code 124 determines whether the story record 116 already contains an existing story that used the same resolved story configuration as the new story (step 720). For example, if the new story is a story configuration for "How were West Coast bookings in January 2022?", the code 124 can check the story record for existing stories with this story configuration. In other words, is there an existing story of the same story type with the same filters? If not, then the new story is deemed to not render a previous story out-of-date, and there is no need to modify the story record 116 (beyond adding the new story to the story record) (see step 722). If there is an existing/previous story in the story record with the same story configuration as the new story, then this existing/previous story is deleted from the story record (step 724). For example, as shown by FIG. 7B, Story 1 is deleted from the story record 116 after concluding that the new story (Story n) has the same story configuration as Story 1. This will cause the user newsfeeds 712 and 714 to lose their reference to Story 1 (while adding a new reference to Story n).

Figure 7C:
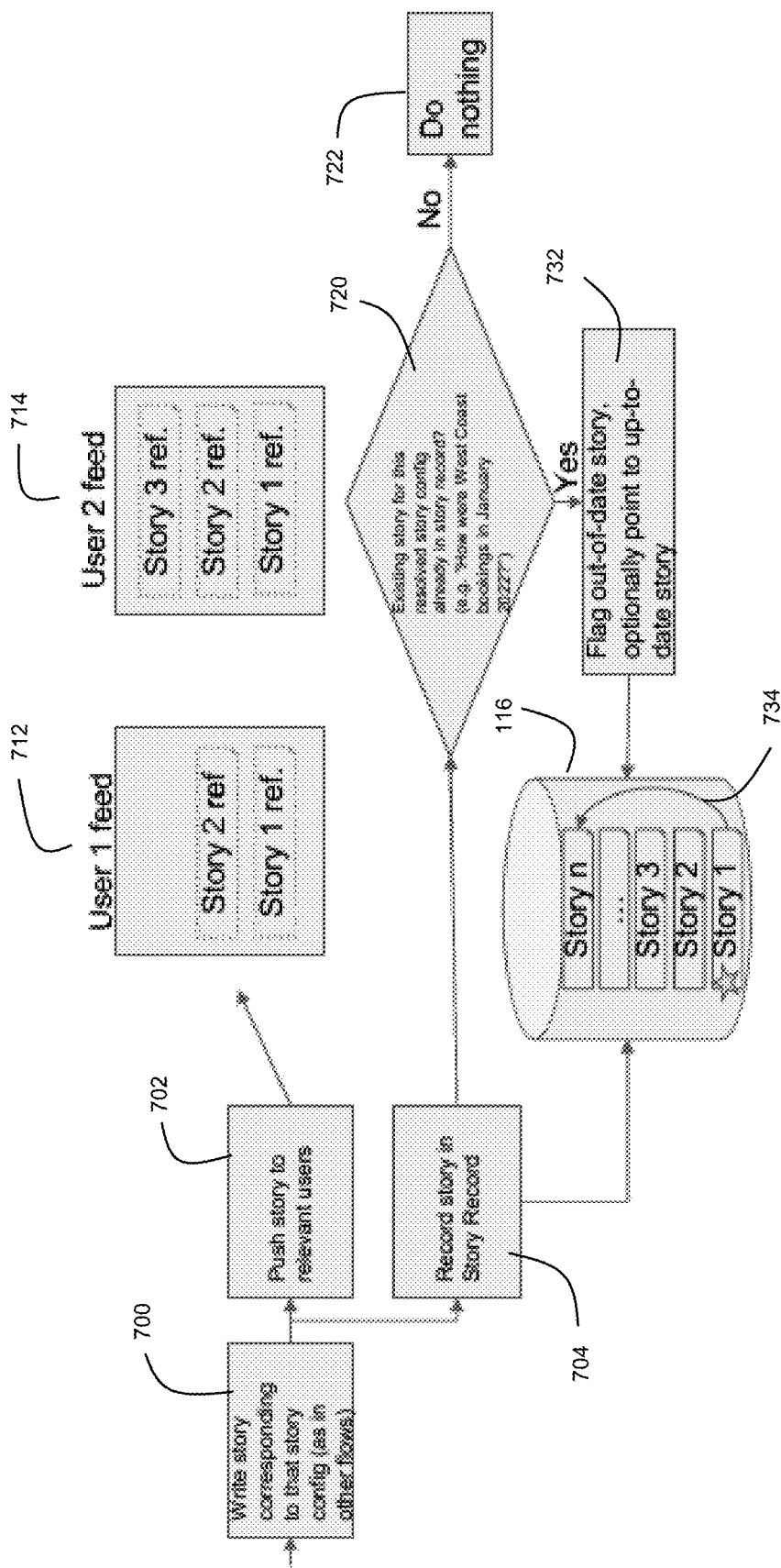

FIG. 7C shows another example for detecting and handling out-of-date stories. In this example, if step 720 results in a determination that the story record 116 includes an existing/previous story with the same story configuration as the new story, then step 732 operates to flag that existing/previous story with an indicator that it contains stale or out-of-date information (e.g., see a flag added to Story 1 in the story record 116 as shown by FIG. 7C). This flag can also include a pointer or link 734 to the new story (Story n). With this example, the user newsfeeds 712 and 714 would retain their reference to Story 1, but the presentation of Story 1 in the newsfeeds would include the indicator about its out-of-date status and can include a user-selectable link for accessing the new story with the current information (Story n).

Figure 7D:
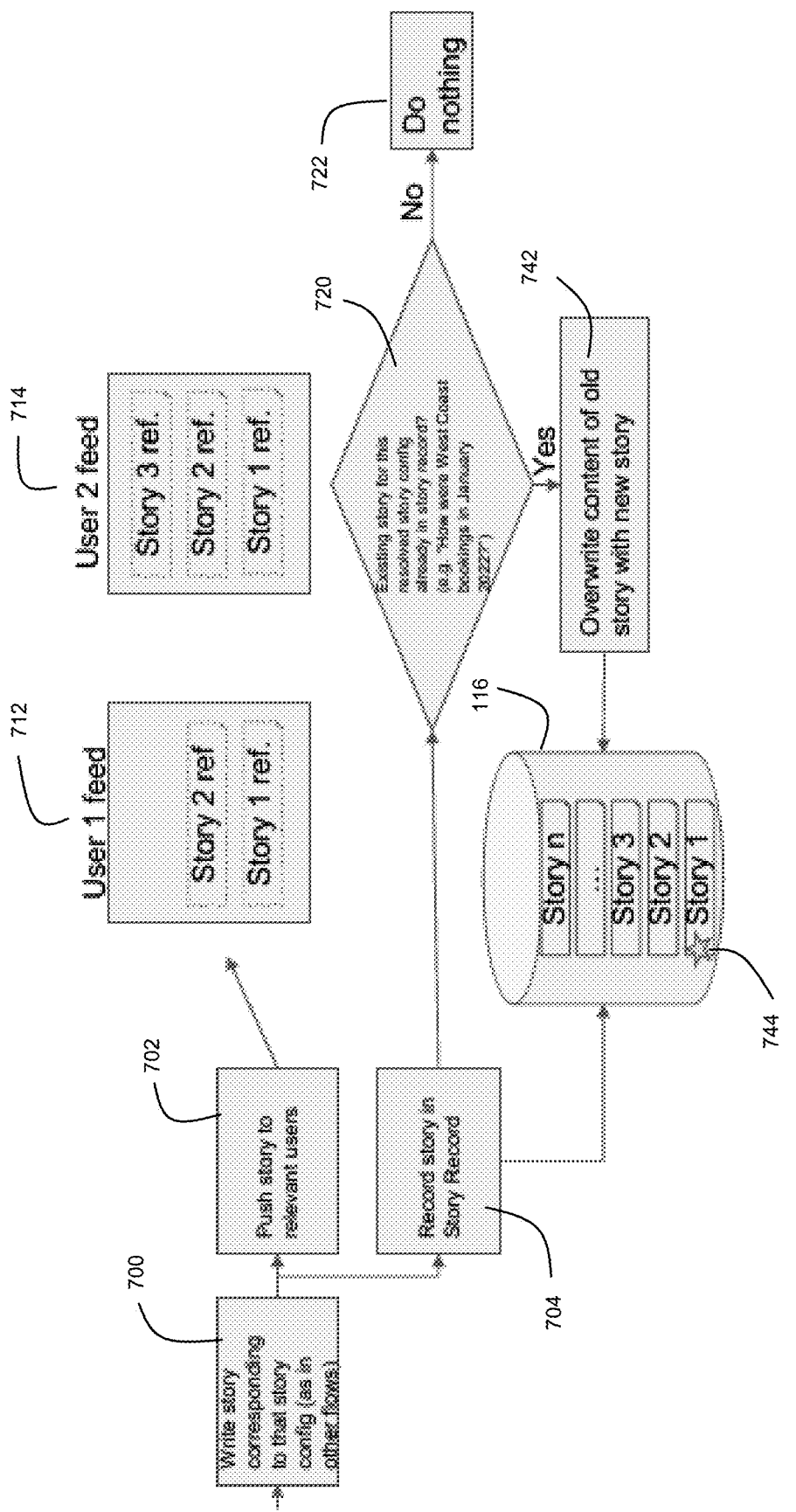

FIG. 7D shows yet another example for detecting and handling out-of-date stories. In this example, if step 720 results in a determination that the story record 116 includes an existing/previous story with the same story configuration as the new story, then step 742 operates to overwrite the content of the existing/previous story with the content of the new story (e.g., see the overwrite 744 of Story 1 shown by FIG. 7D). With such an overwrite, when a user accesses Story 1 from the newsfeeds (e.g., newsfeeds 712 and 714), the user can be served with the new version of Story 1 rather than the old version. The new story (Story n) may also be added to the story record 116 as its own new story if desired by a practitioner; although this need not be the case.

Figure 7E:
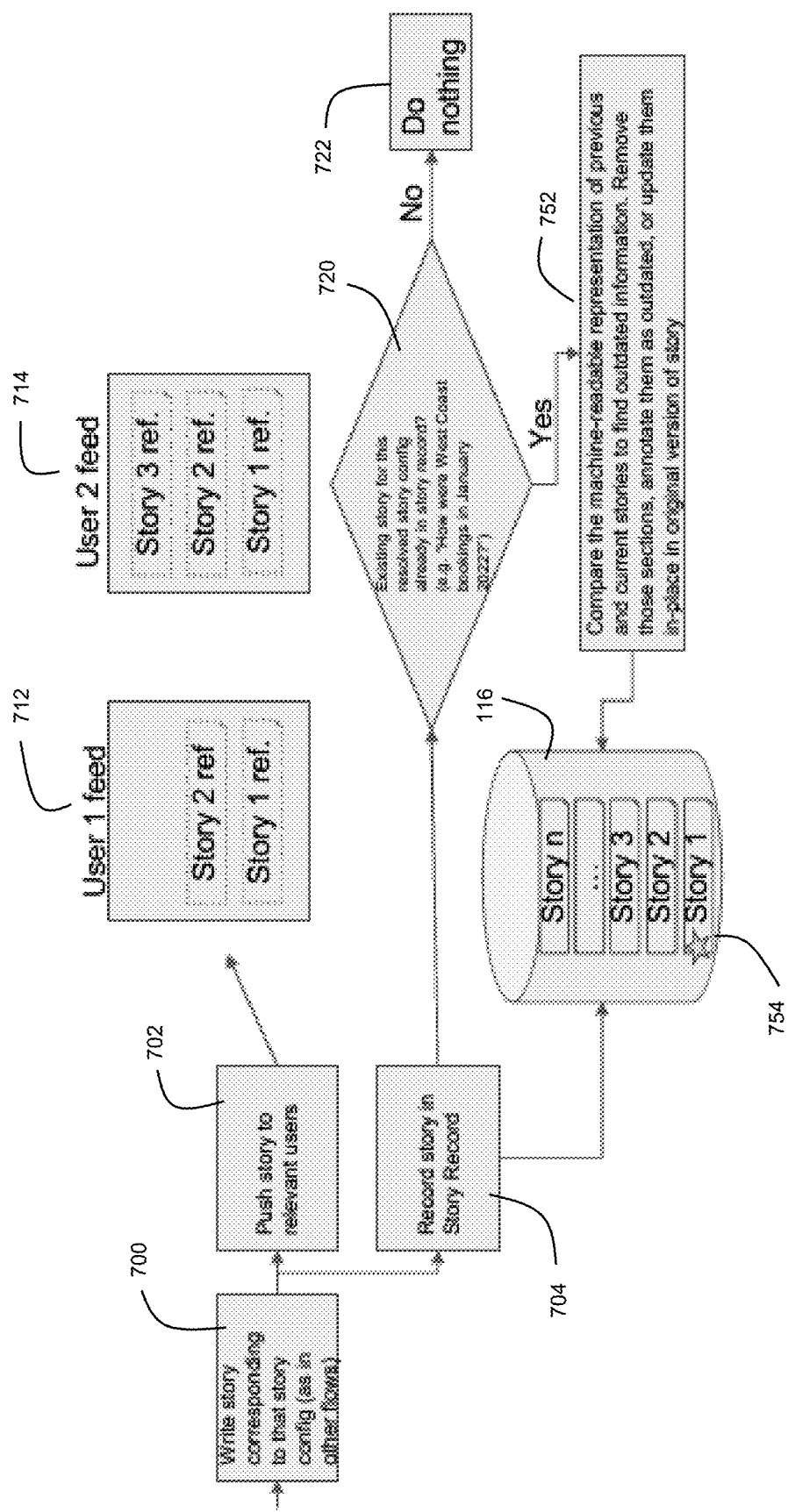

FIG. 7E shows another example for detecting and handling out-of-date stories, where FIG. 7E operates similarly to FIG. 7D, but where step 752 of FIG. 7E replaces step 742 of FIG. 7D. At step 752, the machine-readable representations of the previous and current stories (e.g., their story configurations) are compared to find outdated information. The sections that contain outdated information are removed, annotated as outdated, or updated in their places in the original versions of the stories.

Figure 7F:
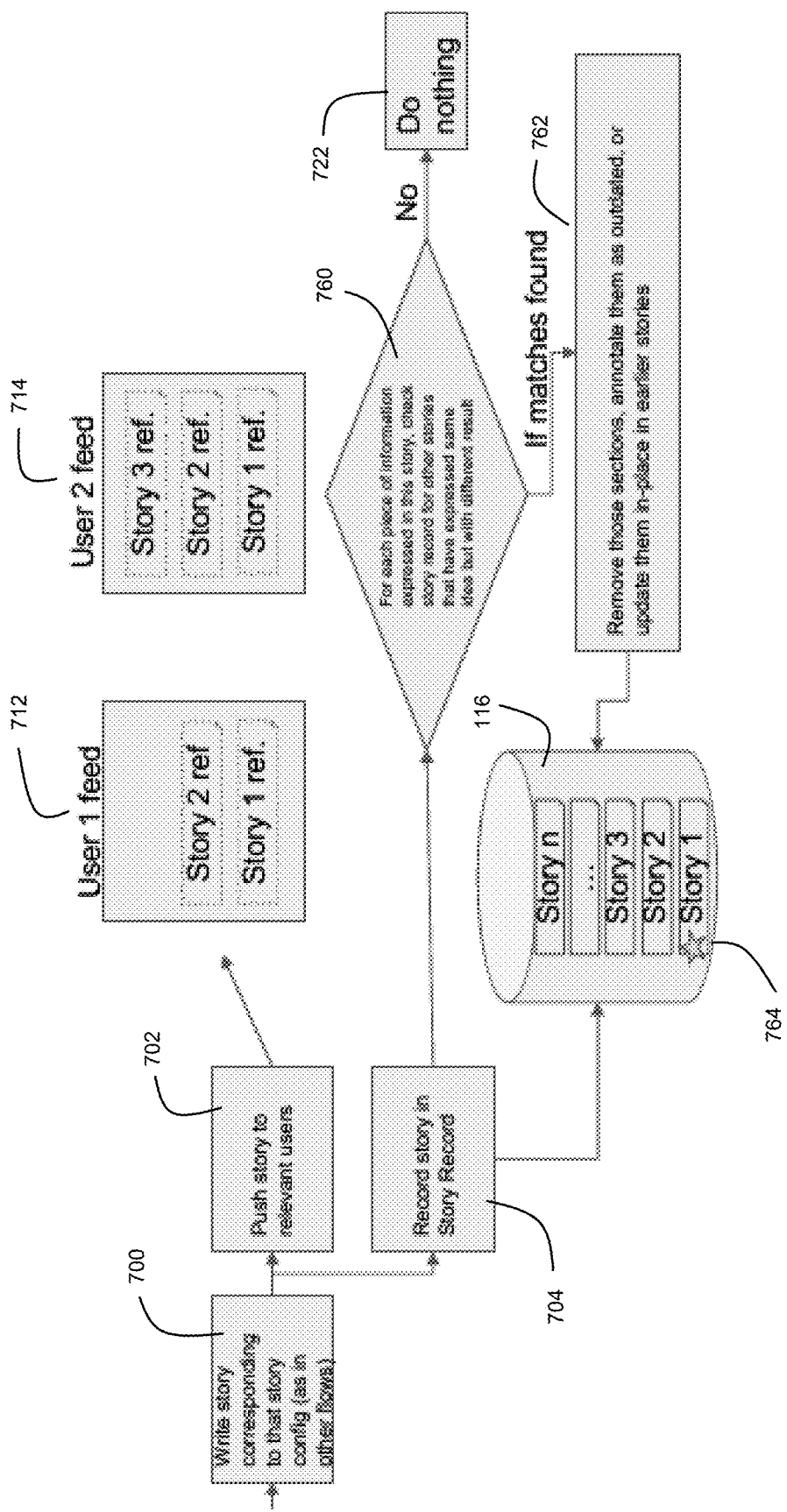

FIG. 7F shows still another example for handling out-of-date stories. In this example, step 760 operates on each item of information presented in the new story. For each item of information in the new story, the code 124 can check the story record 116 for existing stories that express the same idea as that item of information but do so with a different result, regardless of whether the existing story shares the same story configuration. Such different results can be in the expression of a value (e.g., a quantification of sales) or in the expression of a characterization (e.g., characterizing sales as "good" or "bad", "growing" or "shrinking", etc.). Techniques such as those discussed above can be used to evaluate the magnitude of change to determine the suitable course of remediating any outdated information. If outdated information is found by step 760, then step 762 can operate to remove the outdated sections from the existing story in the story record 116, annotate the existing story in the story record 116 as outdated, or update the existing story in the story record 116 in place with the updated information (see 764 in FIG. 7F). The new story (Story n) may also be added to the story record 116 as its own new story if desired by a practitioner; although this need not be the case.

With the example of FIG. 7F, step 760 can find outdated information in an existing story even if the existing story has a different story configuration than the new story. Thus, if an existing "Breakdown" story expresses the same information or idea as a new "Track" story, step 760 can operate to evaluate whether the existing Breakdown story presents outdated information in view of the content of the new Track story. For example, an existing Breakdown story for "Breakdown bookings this week by salesperson" can be expressed as "John Smith is the worst salesperson so far this week, closing only one deal". Then, a new Track story can be for "Track John Smith's sales this week", and it can be expressed as "John Smith has made 5 deals so far this week". Step 760 can operate to determine that the existing Breakdown story is no longer accurate and this existing story can either be removed or re-generated so that it presents current information (possibly with an new characterization).

Figure 7G:
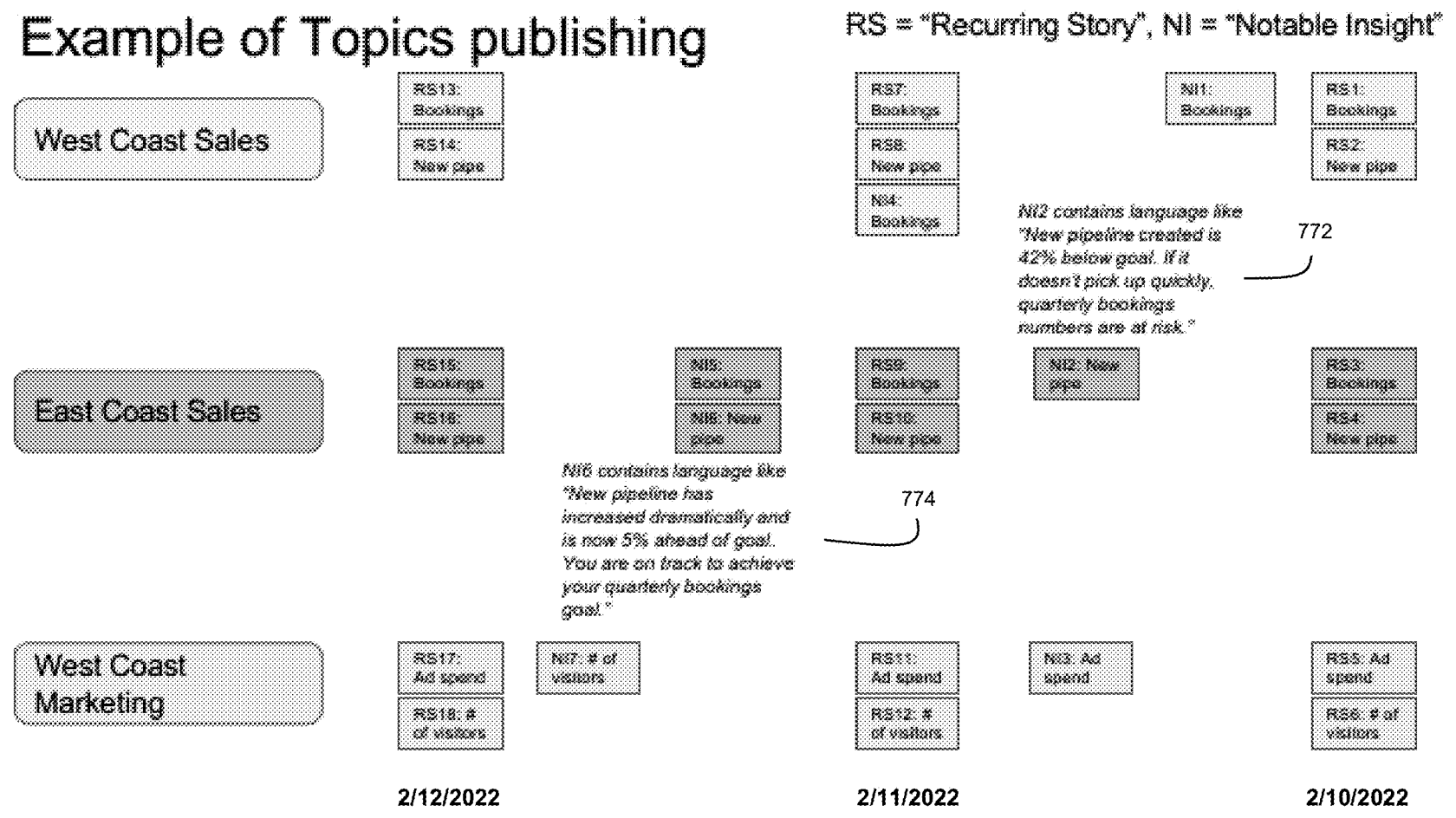
Figure 7H:
Figure 7I:

FIG. 7G shows an example timeline of stories published over time for topics of West Coast Sales, East Coast Sales, and West Coast Marketing. In this example, notable insights story (NI2) for a "New Pipe" story configuration that was published on Feb. 10, 2022 includes a statement such as "New pipeline created is 42% below goal. If it doesn't pick up quickly, quarterly bookings numbers are at risk." Then, on Feb. 11, 2022, a new notable insights story (NI6) for the "New Pipe" story configuration is generated; and NI6 includes a statement such as "New pipeline has increased dramatically and is now 5% ahead of goal. You are on track to achieve your quarterly bookings goal." Accordingly, in this example it can be seen that new information from NI6 has rendered NI2 out-of-date. To rectify this, in an example embodiment, the code 124 can remove NI2 from the story record 116 using techniques as described above, which causes NI2 to be removed from the newsfeeds of users who follow the East Coast Sales topic (see 782 in FIG. 7H). In another example embodiment, the code 124 can flag NI2 as containing out-of-date information (see 784 in FIG. 7I). In this case, the flagged version of NI2 can remain in the newsfeeds of users who follow the East Coast Sales topic, and this flag may include a link to the new story with the updated information (NI6).

These and other modifications to example embodiments the invention described herein will be recognizable upon review of the teachings herein.

What is claimed is:

1. A method comprising:
receiving a request to generate a natural language narrative story expressing insights about a structured data set based on a semantic source model for the natural language narrative story;
generating a natural language narrative story about the structured data set via a processor based on a semantic source model for the natural language narrative story in combination with an ontology that defines a knowledge base of context for the structured data and that includes a plurality of entities that represent a plurality of users or groups of users, wherein the semantic source model represents the natural language narrative story in terms of semantic concepts to be expressed in the generated natural language narrative story, wherein the semantic concepts are parameterized with respect to the ontology;
determining via a processor and based on the semantic source model a user to whom the natural language narrative story generated from the analyzed semantic source model is to be shared, wherein determining the user includes determining whether the semantic source model relates to one or more of the entities that represent one or more of the users or groups of the users, and wherein the user is determined based on whether the semantic source model for the subject natural language narrative stories identifies one or more of the entities that represent one or more of the users or groups of the users; and
transmitting the generated natural language narrative story to a computing device associated with the user via a communication interface.

2. The method recited in claim 1, wherein the processor, in response to a determination that a subject semantic source model identifies an entity from the ontology that represents the user, determines that the natural language narrative story generated from the subject semantic source model is to be shared with the user.

3. The method recited in claim 1, wherein the ontology comprises a plurality of entities, and wherein the processor determines the user by (1) accessing electronic calendar data for a plurality of users, (2) processing the semantic source model in coordination with the accessed electronic calendar data to determine whether the semantic source model identifies one or more entities from the ontology that are relevant to the accessed electronic calendar data, and (3) determining the user with whom to share subject natural language narrative stories based on a determination regarding whether the semantic source models for the subject natural language narrative stories identify one or more entities from the ontology are relevant to the accessed electronic calendar data.

4. The method recited in claim 3, wherein the processor, in response to a determination that a subject semantic source model identifies an entity from the ontology that is relevant to an entry in the accessed electronic calendar data for the user, determines that the natural language narrative story generated from the subject semantic source model is to be shared with the user.

5. The method recited in claim 4, wherein the processor (1) processes the accessed electronic calendar data to identify people or organizations with which the users have scheduled calendar entries and (2) compares the identified people or organizations with entities identified by the semantic source models to determine whether the semantic source models identify one or more entities from the ontology that are relevant to the accessed electronic calendar data.

6. The method recited in claim 1, wherein the processor (1) maintains a plurality of topics including one or more of the topics is associated with the semantic source model, (2) associates the generated natural language narrative stories with the topics that are associated with the semantic source models from which the generated natural language narrative stories are generated, and (3) shares the generated natural language narrative stories based on their associated topics.

7. The method recited in claim 6, wherein a plurality of users follow a plurality of the topics, and wherein the processor shares the generated natural language narrative stories with the user based on a determination that the user follows a topic associated with the generated natural language narrative story.

8. The method recited in claim 7, wherein the topics comprise a plurality of topics that have relationships with each other, and wherein the processor determines the user with whom to share the generated natural language narrative story based on the relationships among the topics that are associated with the generated natural language narrative stories, and wherein the relationships include hierarchical relationships among topics, peer relationships among topics, and/or influencer relationships among topics.

9. The method recited in claim 1, wherein the semantic source model identifies an intent to be addressed by the natural language narrative story, wherein the intent is parameterized based on the ontology with respect to the structured data, wherein the semantic source model comprises a story configuration from which the natural language narrative story is generated, wherein the story configuration includes the parameterized intent.

10. The method recited in claim 1, wherein the processor (1) performs statistical analysis on one or more metrics included in the semantic source model to determine if the semantic source model contains notable information and (2) generates a notable insight story based on a semantic source model determined to contain statistically notable information.

11. The method recited in 1, wherein the processor (1) compares one or more metrics included in the semantic source model with one or more defined thresholds to determine if the semantic source model contains notable information and (2) generates a notable insight story based on a determination that the semantic source model contains notable information.

12. The method recited in claim 1, wherein the processor (1) determines interestingness and/or importance values for the natural language narrative story and (2) compares the determined interestingness and/or importance values with defined thresholds to determine if the natural language narrative story expresses notable information and is thus to be published as a notable insight story.

13. One or more non-transitory computer readable media having instructions stored thereon for performing a method, the method comprising:
  receiving a request to generate a natural language narrative story expressing insights about a structured data set based on a semantic source model for the natural language narrative story;
  generating a natural language narrative story about the structured data set via a processor based on a semantic source model for the natural language narrative story in combination with an ontology that defines a knowledge base of context for the structured data and that includes a plurality of entities that represent a plurality of users or groups of users, wherein the semantic source model represents the natural language narrative story in terms of semantic concepts to be expressed in the generated natural language narrative story, wherein the semantic concepts are parameterized with respect to the ontology;
  determining via a processor and based on the semantic source model a user to whom the natural language narrative story generated from the analyzed semantic source model is to be shared, wherein determining the user includes determining whether the semantic source model relates to one or more of the entities that represent one or more of the users or groups of the users, and wherein the user is determined based on whether the semantic source model for the subject natural language narrative stories identifies one or more of the entities that represent one or more of the users or groups of the users; and
  transmitting the generated natural language narrative story to a computing device associated with the user via a communication interface.

14. The one or more non-transitory computer readable media recited in claim 13, wherein the processor, in response to a determination that a subject semantic source model identifies an entity from the ontology that represents the user, determines that the natural language narrative story generated from the subject semantic source model is to be shared with the user.

15. The one or more non-transitory computer readable media recited in claim 13, wherein the ontology comprises a plurality of entities, and wherein the processor determines the user by (1) accessing electronic calendar data for a plurality of users, (2) processing the semantic source model in coordination with the accessed electronic calendar data to determine whether the semantic source model identifies one or more entities from the ontology that are relevant to the accessed electronic calendar data, and (3) determining the user with whom to share subject natural language narrative stories based on a determination regarding whether the semantic source models for the subject natural language narrative stories identify one or more entities from the ontology are relevant to the accessed electronic calendar data.

16. The one or more non-transitory computer readable media recited in claim 15, wherein the processor, in response to a determination that a subject semantic source model identifies an entity from the ontology that is relevant to an entry in the accessed electronic calendar data for the user, determines that the natural language narrative story generated from the subject semantic source model is to be shared with the user.

17. The one or more non-transitory computer readable media recited in claim 16, wherein the processor (1) processes the accessed electronic calendar data to identify people or organizations with which the users have scheduled calendar entries and (2) compares the identified people or organizations with entities identified by the semantic source models to determine whether the semantic source models identify one or more entities from the ontology that are relevant to the accessed electronic calendar data.

18. The one or more non-transitory computer readable media recited in claim 13, wherein the processor (1) maintains a plurality of topics including one or more of the topics is associated with the semantic source model, (2) associates the generated natural language narrative stories with the topics that are associated with the semantic source models from which the generated natural language narrative stories are generated, and (3) shares the generated natural language narrative stories based on their associated topics.

19. The one or more non-transitory computer readable media recited in claim 18, wherein a plurality of users follow a plurality of the topics, and wherein the processor shares the generated natural language narrative stories with the user based on a determination that the user follows a topic associated with the generated natural language narrative story.

20. The one or more non-transitory computer readable media recited in claim 19, wherein the topics comprise a plurality of topics that have relationships with each other, and wherein the processor determines the user with whom to share the generated natural language narrative story based on the relationships among the topics that are associated with the generated natural language narrative stories, and wherein the relationships include hierarchical relationships among topics, peer relationships among topics, and/or influencer relationships among topics.

21. The one or more non-transitory computer readable media recited in claim 13, wherein the semantic source model identifies an intent to be addressed by the natural language narrative story, wherein the intent is parameterized based on the ontology with respect to the structured data, wherein the semantic source model comprises a story configuration from which the natural language narrative story is generated, wherein the story configuration includes the parameterized intent.

22. The one or more non-transitory computer readable media recited in claim 13, wherein the processor (1) performs statistical analysis on one or more metrics included in the semantic source model to determine if the semantic source model contains notable information and (2) generates a notable insight story based on a semantic source model determined to contain statistically notable information.

23. The one or more non-transitory computer readable media recited in 13, wherein the processor (1) compares one or more metrics included in the semantic source model with one or more defined thresholds to determine if the semantic source model contains notable information and (2) generates a notable insight story based on a determination that the semantic source model contains notable information.

24. The one or more non-transitory computer readable media recited in claim 13, wherein the processor (1) determines interestingness and/or importance values for the natural language narrative story and (2) compares the determined interestingness and/or importance values with defined thresholds to determine if the natural language narrative story expresses notable information and is thus to be published as a notable insight story.

25. A system comprising:
a communication interface configured to receive a request to generate a natural language narrative story expressing insights about a structured data set based on a semantic source model for the natural language narrative story; and
a processor configured to: (1) generate a natural language narrative story about the structured data set via a processor based on a semantic source model for the natural language narrative story in combination with an ontology that defines a knowledge base of context for the structured data and that includes a plurality of entities that represent a plurality of users or groups of users, wherein the semantic source model represents the natural language narrative story in terms of semantic concepts to be expressed in the generated natural language narrative story, wherein the semantic concepts are parameterized with respect to the ontology, and (2) determine via a processor and based on the semantic source model a user to whom the natural language narrative story generated from the analyzed semantic source model is to be shared, wherein determining the user includes determining whether the semantic source model relates to one or more of the entities that represent one or more of the users or groups of the users, and wherein the user is determined based on whether the semantic source model for the subject natural language narrative stories identifies one or more of the entities that represent one or more of the users or groups of the users, and wherein the communication interface is configured to transmit the generated natural language narrative story to a computing device associated with the user.

26. The system recited in claim 25, wherein the processor, in response to a determination that a subject semantic source model identifies an entity from the ontology that represents the user, determines that the natural language narrative story generated from the subject semantic source model is to be shared with the user.

27. The system recited in claim 25, wherein the ontology comprises a plurality of entities, and wherein the processor determines the user by (1) accessing electronic calendar data for a plurality of users, (2) processing the semantic source model in coordination with the accessed electronic calendar data to determine whether the semantic source model identifies one or more entities from the ontology that are relevant to the accessed electronic calendar data, and (3) determining the user with whom to share subject natural language narrative stories based on a determination regarding whether the semantic source models for the subject natural language narrative stories identify one or more entities from the ontology are relevant to the accessed electronic calendar data.

28. The system recited in claim 27, wherein the processor, in response to a determination that a subject semantic source model identifies an entity from the ontology that is relevant to an entry in the accessed electronic calendar data for the user, determines that the natural language narrative story generated from the subject semantic source model is to be shared with the user.

29. The system recited in claim 28, wherein the processor (1) processes the accessed electronic calendar data to identify people or organizations with which the users have scheduled calendar entries and (2) compares the identified people or organizations with entities identified by the semantic source models to determine whether the semantic source models identify one or more entities from the ontology that are relevant to the accessed electronic calendar data.

30. The system recited in claim 25, wherein the processor (1) maintains a plurality of topics including one or more of the topics is associated with the semantic source model, (2) associates the generated natural language narrative stories with the topics that are associated with the semantic source models from which the generated natural language narrative stories are generated, and (3) shares the generated natural language narrative stories based on their associated topics.

31. The system recited in claim 30, wherein a plurality of users follow a plurality of the topics, and wherein the processor shares the generated natural language narrative stories with the user based on a determination that the user follows a topic associated with the generated natural language narrative story.

32. The system recited in claim 31, wherein the topics comprise a plurality of topics that have relationships with each other, and wherein the processor determines the user with whom to share the generated natural language narrative story based on the relationships among the topics that are associated with the generated natural language narrative stories, and wherein the relationships include hierarchical relationships among topics, peer relationships among topics, and/or influencer relationships among topics.

33. The system recited in claim 25, wherein the semantic source model identifies an intent to be addressed by the natural language narrative story, wherein the intent is parameterized based on the ontology with respect to the structured data, wherein the semantic source model comprises a story configuration from which the natural language narrative story is generated, wherein the story configuration includes the parameterized intent.

34. The system recited in claim 25, wherein the processor (1) performs statistical analysis on one or more metrics included in the semantic source model to determine if the semantic source model contains notable information and (2) generates a notable insight story based on a semantic source model determined to contain statistically notable information.

35. The system recited in 25, wherein the processor (1) compares one or more metrics included in the semantic source model with one or more defined thresholds to determine if the semantic source model contains notable information and (2) generates a notable insight story based on a determination that the semantic source model contains notable information.

* * * * *